(12) United States Patent
Nishiwaki et al.

(10) Patent No.: US 7,330,418 B2
(45) Date of Patent: *Feb. 12, 2008

(54) OPTICAL DISK WITH PLURAL SIGNAL MARK POSITIONS IN A DIRECTION SUBSTANTIALLY PERPENDICULAR TO TRACKS

(75) Inventors: Seiji Nishiwaki, Osaka (JP); Kazuo Momoo, Hirakata (JP); Junji Nagaoka, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 202 days.

This patent is subject to a terminal disclaimer.

(21) Appl. No.: 11/072,292

(22) Filed: Mar. 7, 2005

(65) Prior Publication Data

US 2005/0157634 A1 Jul. 21, 2005

Related U.S. Application Data

(62) Division of application No. 09/788,367, filed on Feb. 21, 2001, now Pat. No. 6,909,685.

(30) Foreign Application Priority Data

Feb. 28, 2000 (JP) .............................. 2000-052594

(51) Int. Cl.
*G11B 7/00* (2006.01)
(52) U.S. Cl. ................. 369/112.01; 369/120; 369/275.4
(58) Field of Classification Search ..................... None
See application file for complete search history.

(56) References Cited

U.S. PATENT DOCUMENTS

| 5,870,353 | A | 2/1999 | Morimoto et al. |
| 6,324,139 | B1 | 11/2001 | Nakane |
| 6,538,963 | B1 | 3/2003 | Fukada |

*Primary Examiner*—Paul W. Huber
(74) *Attorney, Agent, or Firm*—Smith, Gambrell & Russell, LLP

(57) ABSTRACT

An optical disk device has a light source which emits light; and light converging means of, in each of signal mark forming regions, each of lands, or each of grooves of an optical disk, converging the light from the light source onto a signal surface of the optical disk with selectively positioning a signal mark at any one of plural positions which are arranged in a direction that is substantially perpendicular to tracks, each of the signal mark forming regions surrounded by adjacent two of boarder lines which are between two the tracks on the signal surface of the optical disk, and which are substantially parallel to the tracks, and each of which substantially divides an area between adjacent tracks in two parts.

13 Claims, 22 Drawing Sheets

OPTICAL DISK WITH PLURAL SIGNAL MARK POSITIONS IN A DIRECTION SUBSTANTIALLY PERPENDICULAR TO TRACKS

CROSS-REFERENCE TO RELATED APPLICATION

This is a divisional application of application Ser. No. 09/788,367 filed Feb. 21, 2001, now U.S. Pat. No. 6,909,685 which is being incorporated in its entirety herein by reference.

BACKGROUND OF THE INVENTION

1. Field of the Invention

The present invention relates to an optical disk which is a medium for recording and storing information, an optical disk device which is used for recording and/or reproducing information on such an optical disk, a data recording method, and a data reproducing method.

2. Related Art of the Invention

The conventional art will be described with reference to FIGS. 19 to 22.

FIG. 19 shows a cross-section configuration of an optical disk device of the conventional art. Referring to FIG. 19, light beams 2 emitted from a radiation light source 1 such as a semiconductor laser are transmitted through a beam splitter 3, and then converted into parallel beams 5 by a collimating lens 4. The light beams 5 are reflected by a reflecting mirror 9 and then converged by an objective lens 11 onto a signal surface 12S on a track formed in the rear face of a optical disk substrate 12.

The objective lens 11 is controlled by an actuator in focusing and tracking directions with respect to the signal surface 12S. The light beams reflected from the signal surface 12S are converged by the objective lens 11 into light beams 15 which are then reflected by the reflecting mirror 9, passed through the collimating lens 4, reflected by the beam splitter 3, and then incident on a photo detector 16. The photo detector 16 detects the amount of a spot 15S of the light beams 15 to produce a sum signal 41S. An actual optical disk device further comprises a configuration for detecting a focussing error and a tracking error. However, such a configuration is not directly related to the present invention, and therefore its description is omitted.

FIGS. 20 and 21 show a cross-section configuration of the optical disk. Referring to FIG. 20, grooves 12G and lands 12L which are concaved and convexed are formed in the signal surface 12S of the optical disk at a pitch p in a radial direction of the optical disk substrate 12. Signal marks 20 having a complex reflectance which is different from that of another region are formed on each of the grooves 12G. Differences of the reflectances are read as a reproduced signal by means of a converged light spot 21 which is subjected to scanning along the groove 12G.

Alternatively, an optical disk may have the cross-section configuration of FIG. 21. Referring to FIG. 21, grooves 12G and lands 12L which are concaved and convexed are formed in the signal surface 12S of the optical disk at a pitch $2p$ in a radial direction of the optical disk substrate 12. Signal marks 20 having a complex reflectance which is different from that of another region are formed on each of the grooves 12G and the lands 12L. Differences of the reflectances are read as a reproduced signal by means of a converged light spot 21 which is subjected to scanning along the groove 12G and the land 12L.

FIG. 22 is a diagram showing the principle of generation of binary codes in the conventional art example. Referring to FIG. 22, when signal marks 22 and 23 are scanned by the converged light spot 21, a sum signal 41S has a signal waveform 24. The signal waveform 24 is sliced at an appropriate detection level 25, so that slice points 24a, 24b, 24c, and 24d are detected at positions corresponding to the beginnings and ends 22S and 22E, and 23S and 23E of the signal marks 22 and 23.

It is assumed that code 1 is set at a bit which is immediately after a slice point and code 0 is set at any bit other than such a bit. If the basic unit T (1 bit length) of the signal length is T=0.14 µm, binary codes which are read from the signal waveform 24 are 10010010001 . . . . In this way, signal marks are converted into binary codes.

Such an optical disk and an optical disk device of the conventional art have the following problem in increasing the information density. When the density of signal marks on an optical disk is increased while fixing the diameter of the converged light spot, crosstalk or interference between codes is increased, thereby impairing the quality of the signal. When aberration and variations of the optical system including the disk are taking into account, there is little room for increasing the density.

SUMMARY OF THE INVENTION

The invention has been conducted in view of the problem. It is an object of the invention to provide an optical disk, an optical disk device, a data recording method, and a data reproducing method in which the information density can be increased without changing the diameter of a converged light spot or the density of signal marks, and the density can be further increased by combining the invention with reduction of the diameter of a converged light spot by a reduced wavelength of a light source or a high NA of an objective lens.

The $1^{st}$ invention of the present invention (corresponding to claim 1) is an optical disk device comprising:

a light source which emits light; and light converging means of, in each of signal mark forming regions, each of lands, or each of grooves of an optical disk, converging the light from said light source onto a signal surface of said optical disk with selectively positioning a signal mark at any one of plural positions which are arranged in a direction that is substantially perpendicular to tracks, each of said signal mark forming regions surrounded by adjacent two of boarder lines which are between two said tracks on the signal surface of said optical disk, and which are substantially parallel to said tracks, and each of which substantially divides an area between adjacent tracks in two parts.

The $2^{nd}$ invention of the present invention (corresponding to claim 2) is an optical disk device according to $1^{st}$ invention, wherein said light converging means has:

a converging lens which converts the light from said light source into substantially parallel light; and light deflecting means of receiving the substantially parallel light which has been converted by said converging lens, and arbitrarily emitting said substantially parallel light so that the light which is to be converged onto said optical disk is converged onto said optical disk with being displaced by a predetermined degree in the direction that is substantially perpendicular to said track, or without being substantially displaced.

The $3^{rd}$ invention of the present invention (corresponding to claim 3) is an optical disk device according to $1^{st}$ or $2^{nd}$ inventions, wherein said device further comprises controlling means of moving the light converged by said light converging means, at a predetermined speed in the direction that is substantially perpendicular to said track, and adjusting an amount of the light emitted by said light source, thereby erasing a signal mark which is already formed on said track.

The 4$^{th}$ invention of the present invention (corresponding to claim 4) is an optical disk device according to 1$^{st}$ or 2$^{nd}$ inventions, wherein said device further comprises controlling means of unevenly moving the light converged by said light converging means, in the direction that is substantially perpendicular to said track, thereby producing a region in which a time period when the converged light exists is short, and a region in which a time period when the converged light exists is long, and adjusting an amount of the light emitted by said light source, thereby erasing a signal mark which is already formed on said track, and forming a new signal mark on said track.

The 5$^{th}$ invention of the present invention (corresponding to claim 5) is an optical disk device according to 2$^{nd}$ invention, wherein said light deflecting means is configured by: a crystal plate having an electrooptic effect; and electrodes which are formed in a predetermined symmetric pattern on a surface and a rear face of said crystal plate, the substantially parallel light which has been converted by said converging lens is incident on a first side face of said crystal plate, transmitted through said crystal plate, and emitted from a second side face of said crystal plate, said second side face being opposed to said first side face, and the light emitted from said second side face is deflected on the basis of a level of a voltage which is applied between said electrodes.

The 6$^{th}$ invention of the present invention (corresponding to claim 6) is an optical disk device according to 5$^{th}$ invention, wherein the light incident on said first side face of said crystal plate forms an angle of 20 deg. or more to a normal of said first side face, and/or the light emitted from said second side face of said crystal plate forms an angle of 20 deg. or more to a normal of said second side face.

The 7$^{th}$ invention of the present invention (corresponding to claim 7) is an optical disk device according to 5$^{th}$ invention, wherein the pattern in which said electrodes are formed is configured by two pairs of saw-tooth like patterns which are engaged with and insulated from each other, voltages which are applied to adjacent electrodes of said two pairs of saw-tooth like patterns have opposite polarities, and light which is transmitted said crystal plate is obliquely incident on a section of said crystal plate said section being substantially perpendicular to said surface and said rear face of said crystal plate including boundaries of said two pairs of saw-tooth like patterns.

The 8$^{th}$ invention of the present invention (corresponding to claim 8) is an optical disk device according to 1$^{st}$ or 2$^{nd}$ inventions, wherein said light converging means performs the light convergence so that, as said signal mark is shorter, a degree of deviating a beginning and an end of said signal mark, and/or a portion between the beginning and the end of said signal mark, from said track is larger.

The 9$^{th}$ invention of the present invention (corresponding to claim 9) is an optical disk device according to 1$^{st}$ or 2$^{nd}$ inventions, wherein said light converging means performs the light convergence so that said signal mark is formed on said optical disk, by using a signal modulation system in which minimum continuation of bit information code 0 is 1.

The 10$^{th}$ invention of the present invention (corresponding to claim 10) is an optical disk having plural tracks, wherein, in each of signal mark forming regions, each of lands, or each of grooves, a signal mark is formed with being positioned at any one of plural positions which are arranged in a direction that is substantially perpendicular tracks each of said signal mark forming regions surrounded by adjacent two of boarder lines which are between two said tracks on the signal surface, and which are substantially parallel to said tracks, and each of which substantially divides an area between adjacent tracks in two parts.

The 11$^{th}$ invention of the present invention (corresponding to claim 11) is an optical disk according to 10$^{th}$ invention, wherein said signal mark is formed so that, as said signal mark is shorter, a degree of deviating a beginning and an end of said signal mark, and/or a portion between the beginning and the end of said signal mark, from said track is larger.

The 12$^{th}$ invention of the present invention (corresponding to claim 12) is an optical disk according to 10$^{th}$ or 11$^{th}$ inventions, wherein said signal mark is formed on said optical disk, by using a signal modulation system in which minimum continuation of bit information code 0 is 1.

The 13$^{th}$ invention of the present invention (corresponding to claim 13) is an optical disk device comprising:

a light source which emits light;

light converging means of converging the light from said light source onto a signal mark of said optical disk according to 10$^{th}$ invention;

light detecting means of detecting light reflected from said optical disk; and analyzing means of, based on a result of detection of said light detecting means, judging a degree of deviation of said signal mark from said track in the direction that is substantially perpendicular to said track, judging a position of said signal mark, and analyzing data recorded on said optical disk.

The 14$^{th}$ invention of the present invention (corresponding to claim 14) is an optical disk device according to 13$^{th}$ invention, wherein said analyzing means performs the judgment by using a portion of the light from said optical disk, said portion being on an outer peripheral side.

The 15$^{th}$ invention of the present invention (corresponding to claim 15) is an optical disk device according to 13$^{th}$ or 14$^{th}$ inventions, wherein said device further comprises light branching means of branching the light reflected from said optical disk into a-light and b-light by means of a predetermined line corresponding to a tangential direction of said track, and causing the a-light and the b-light to proceed to said light detecting means, said light detecting means has a-light amount detecting means of detecting an amount of the a-light, and b-light amount detecting means of detecting an amount of the b-light, and said analyzing means judges the deviation degree on the basis of a difference between the amount of the a-light and the amount of the b-light, and judges a length of said signal mark in a substantially tangential direction of said track on the basis of a sum of the amount of the a-light and the amount of the b-light.

The 16$^{th}$ invention of the present invention (corresponding to claim 16) is an optical disk device according to 13$^{th}$ or 14$^{th}$ inventions, wherein said device further comprises light branching means of: branching the light reflected from said optical disk into light of an inner peripheral side of the reflected light, and light of an outer peripheral side of the reflected light; further branching the light of the outer peripheral side into a-light and b-light by means of a predetermined line corresponding to a tangential direction of said track; and causing the light of the inner peripheral side, the a-light and the b-light to proceed to said light detecting means, said light detecting means has inner-periphery light amount detecting means of detecting an amount of the light of the inner peripheral side, a-light amount detecting means of detecting an amount of the a-light, and b-light amount detecting means of detecting an amount of the b-light, and said analyzing means judges the deviation degree on the basis of a difference between the amount of the a-light and the amount of the b-light, and judges a length of said signal mark in a substantially tangential direction of said track on the basis of the amount of the light of the inner peripheral side, a sum of the amount of the a-light and the amount of the b-light, or a sum of the amount of the light of the inner peripheral side, and the sum of the amount of the a-light and the amount of the b-light.

The 17$^{th}$ invention of the present invention (corresponding to claim 17) is an optical disk device according to 13$^{th}$ or 14$^{th}$ inventions, wherein said analyzing means judges a beginning of said signal mark when the sum or the amount of the light of the inner peripheral side is reduced or increased to substantially reach a predetermined value, judges an end of said signal mark when the sum or the amount of the light of the inner peripheral side is increased or reduced to substantially reach a predetermined value, and reads that, when, in the beginning or the end of said signal mark, the difference is larger than a predetermined first value which is positive, it means that a data in the beginning or the end is a predetermined first data value; when the difference is smaller than a predetermined second value which is negative, it means that the data in the beginning or the end is a predetermined second data value; and, when the difference is not smaller than the second value and not larger than the first value, it means that the data in the beginning or the end is a predetermined third data value.

The 18$^{th}$ invention of the present invention (corresponding to claim 18) is an optical disk device according to 13$^{th}$ or 14$^{th}$ inventions, wherein said device further comprises light branching means of branching the light reflected from said optical disk into a-light, b-light, c-light, and d-light by means of a first line corresponding to a tangential direction of said track and a second line corresponding to the direction perpendicular to said track, and causing the a-light, the b-light, the c-light, and the d-light to proceed to said light detecting means, the a-light and the c-light are in diagonal relationship in the reflected light, the b-light and the d-light are in diagonal relationship in the reflected light, said light detecting means has a-light amount detecting means of detecting an amount of the a-light, b-light amount detecting means of detecting an amount of the b-light, c-light amount detecting means of detecting an amount of the c-light, and d-light amount detecting means of detecting an amount of the d-light, and said analyzing means judges the deviation degree on the basis of a difference between a first sum of the amount of the a-light and the amount of the c-light and a second sum of the amount of the b-light and the amount of the d-light, and judges a length of said signal mark in a substantially tangential direction of said track on the basis of a sum of the first sum and the second sum.

The 19$^{th}$ invention of the present invention (corresponding to claim 19) is an optical disk device according to 13$^{th}$ or 14$^{th}$ inventions, wherein said device further comprises light branching means of: branching the light reflected from said optical disk into light of an inner peripheral side of the reflected light, and light of an outer peripheral side of the reflected light; further branching the light of the outer peripheral side into a-light, b-light, c-light, and d-light by means of a first line corresponding to a tangential direction of said track and a second line corresponding to the direction perpendicular to said track; and causing the light of the inner peripheral side, the a-light, the b-light, the c-light, and the d-light to proceed to said light detecting means, the a-light and the c-light are in diagonal relationship in the reflected light, the b-light and the d-light are in diagonal relationship in the reflected light, said light detecting means has inner-periphery light amount detecting means of detecting an amount of the light of the inner peripheral side, a-light amount detecting means of detecting an amount of the a-light, b-light amount detecting means of detecting an amount of the b-light, c-light amount detecting means for detecting an amount of the c-light, and d-light amount detecting means of detecting an amount of the d-light, and said analyzing means judges the deviation degree on the basis of a difference between a first sum of the amount of the a-light and the amount of the c-light and a second sum of the amount of the b-light and the amount of the d-light, and judges a length of said signal mark in a substantially tangential direction of said track on the basis of the amount of the light of the inner peripheral side, the sum of the first sum and the second sum, or a sum of the amount of the light of the inner peripheral side and the sum of the first sum and the second sum.

The 20$^{th}$ invention of the present invention (corresponding to claim 20) is an optical disk device according to any one of 13$^{th}$, 14$^{th}$ inventions, wherein said analyzing means judges a beginning of said signal mark when the sum or the amount of the light of the inner peripheral side is reduced to substantially reach a predetermined value, judges an end of said signal mark when the sum or the amount of the light of the inner peripheral side is increased to substantially reach a predetermined value, reads that, when, in the beginning of said signal mark, the difference is larger than a predetermined first value which is positive, it means that a data in the beginning is a first predetermined data value; when the difference is smaller than a predetermined second value which is negative, it means that the data in the beginning is a predetermined second data value; and, when the difference is not smaller than the second value and not larger than the first value, it means that the data in the beginning is a predetermined third data value, and reads that, when, in the end of said signal mark, the difference is larger than the first value, it means that a data in the end is the third data value; when the difference is smaller than the second value, it means that the data in the end is the first data value; and, when the difference is not smaller than the second value and not larger than the first value, it means that the data in the end is the third data value.

The 21$^{st}$ invention of the present invention (corresponding to claim 21) is a data recording method in which, in each of signal mark forming regions, each of lands, or each of grooves of an optical disk, light from an light source is converged onto said optical disk with selectively positioning a signal mark at any one of plural positions which are arranged in a direction that is substantially perpendicular to tracks thereby forming a signal mark on said optical disk, each of said signal mark forming regions surrounded by adjacent two of boarder lines which are between two said tracks on the signal surface of said optical disk, and which are substantially parallel to said tracks, and each of which substantially divides an area between adjacent tracks in two parts.

The 22$^{nd}$ invention of the present invention (corresponding to claim 22) is a data reproducing method in which light is converged onto a signal mark of said optical disk according to 10$^{th}$ or 11$^{th}$ inventions, light reflected from said optical disk is detected; based on a result of the detection, judging a degree of deviation of said signal mark on each of tracks of said optical disk, from said track in the direction that is substantially perpendicular to said track, judging a position of said signal mark, and analyzing data recorded on said optical disk to reproduce the data.

BRIEF DESCRIPTION OF THE DRAWINGS

[Brief Description of the Drawings]

Figure 1:
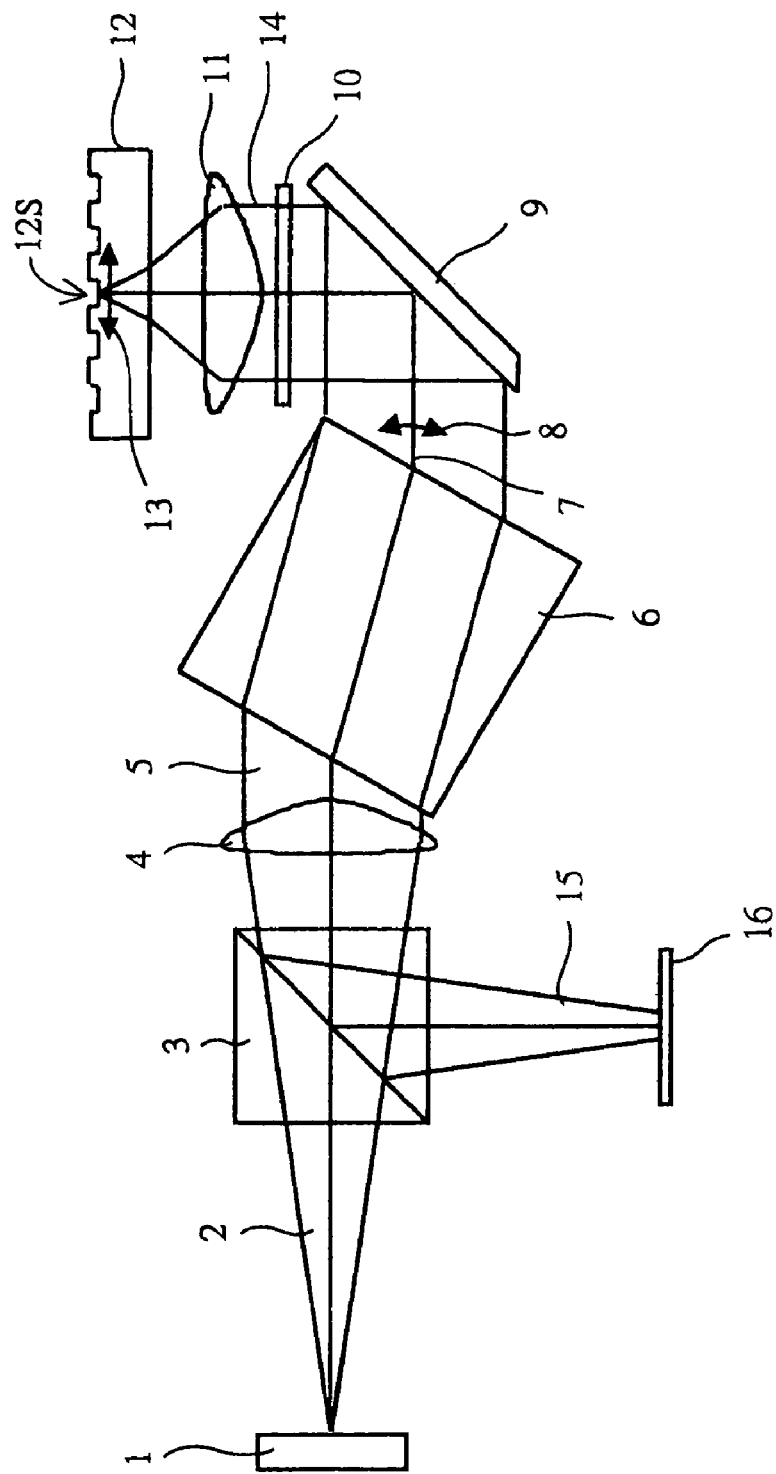

[FIG. 1]
FIG. 1 is a view showing a cross-section configuration of an optical disk device of embodiments of the invention.

Figure 2:
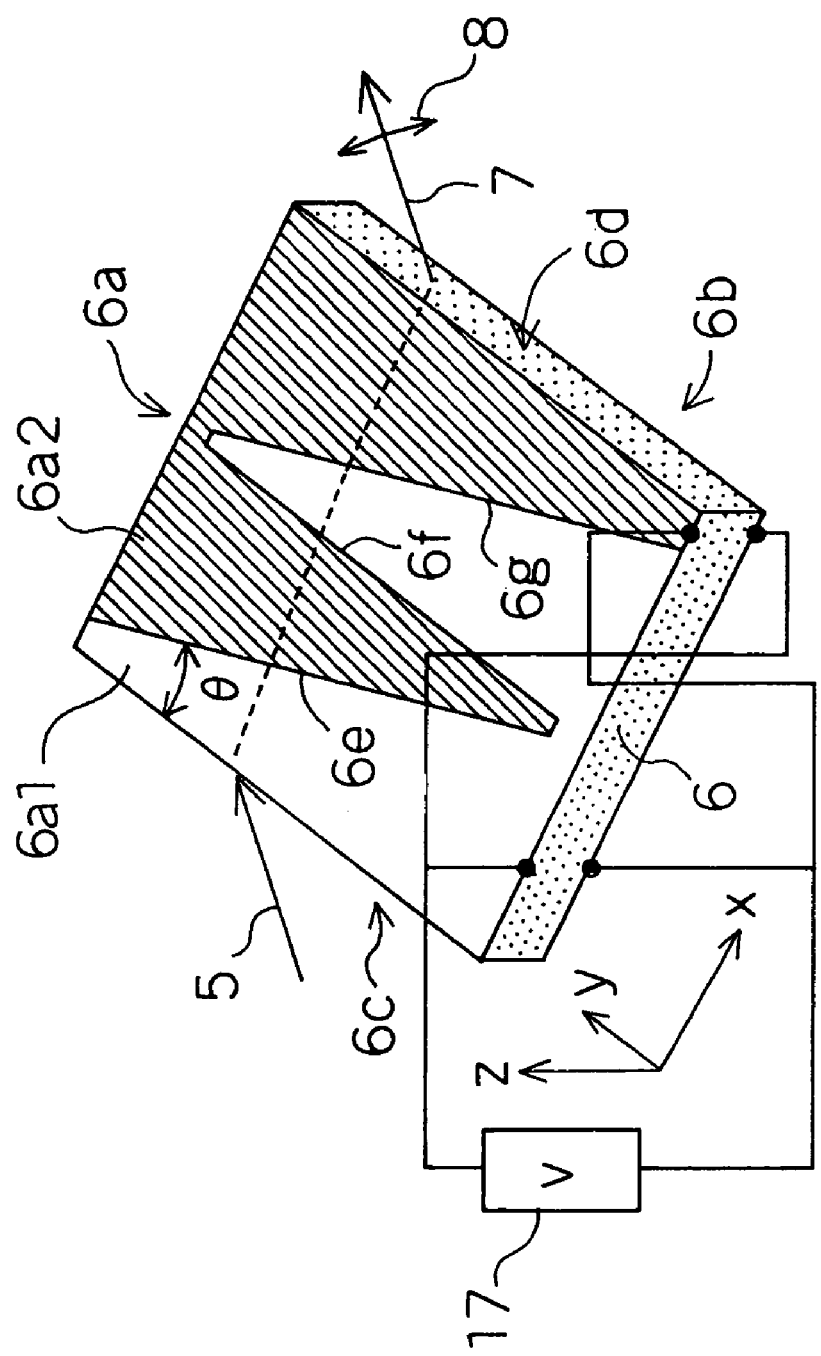

[FIG. 2]
FIG. 2 is a view showing the external configuration of a light deflecting element in the embodiments of the invention.

Figure 3:
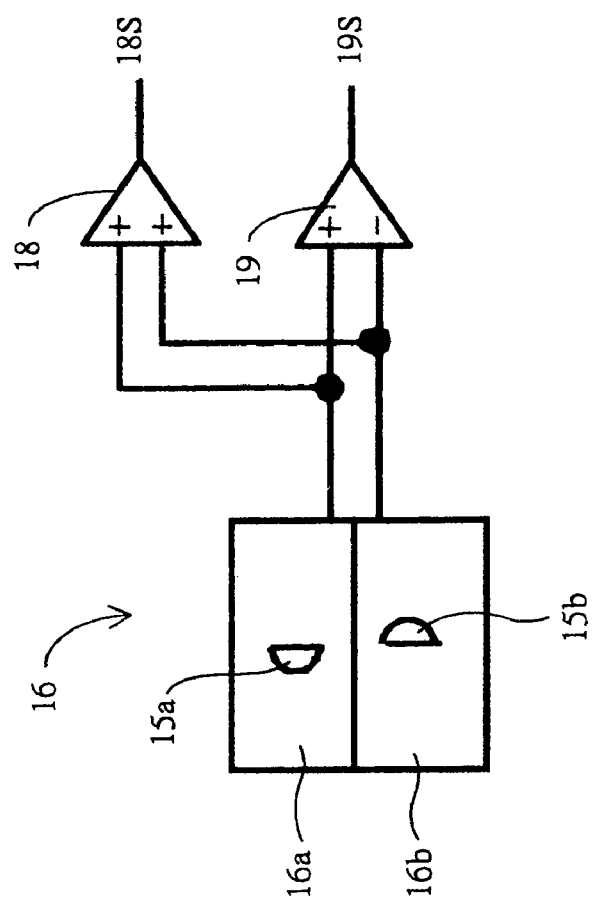
Figure 3:
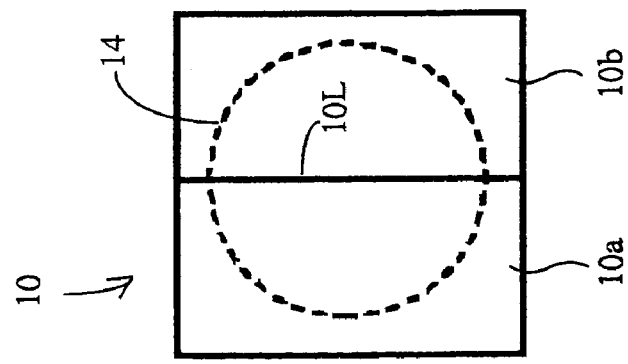

[FIG. 3]
FIG. 3 is a diagram illustrating the appearance of a hologram element and a photo detector in a first embodiment of the invention.

Figure 4:
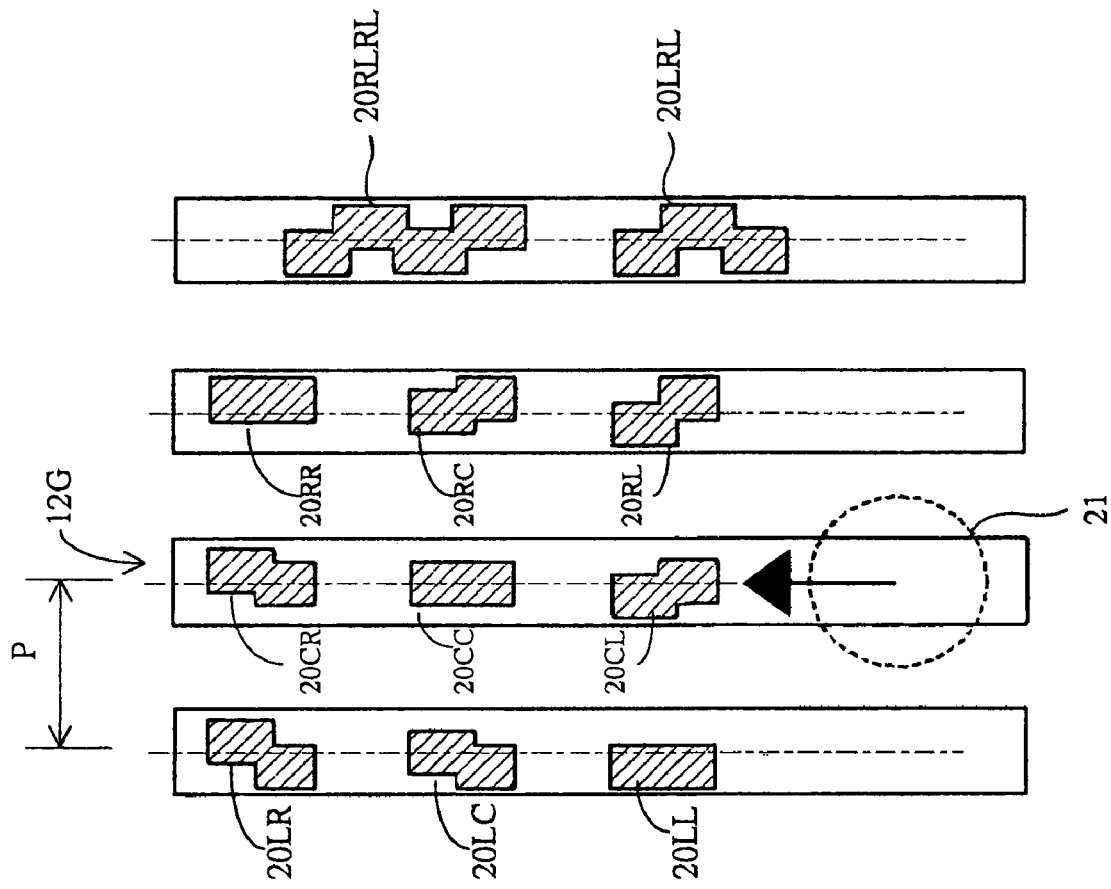

[FIG. 4]
FIG. 4 is a view showing the external shape of signal marks in the first embodiment of the invention.

Figure 5:
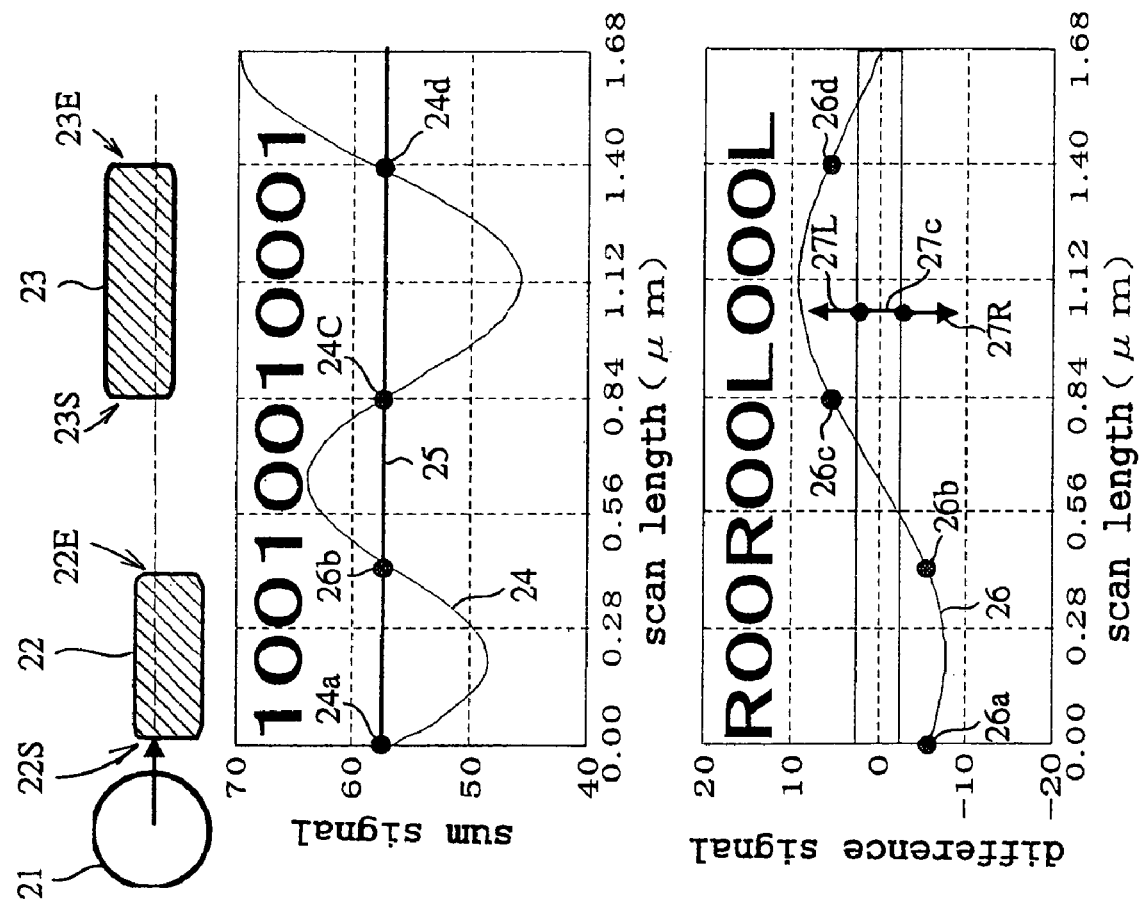

[FIG. 5]
FIG. 5 is a diagram showing the principle of generation of quaternary codes in the first embodiment of the invention.

Figure 6:
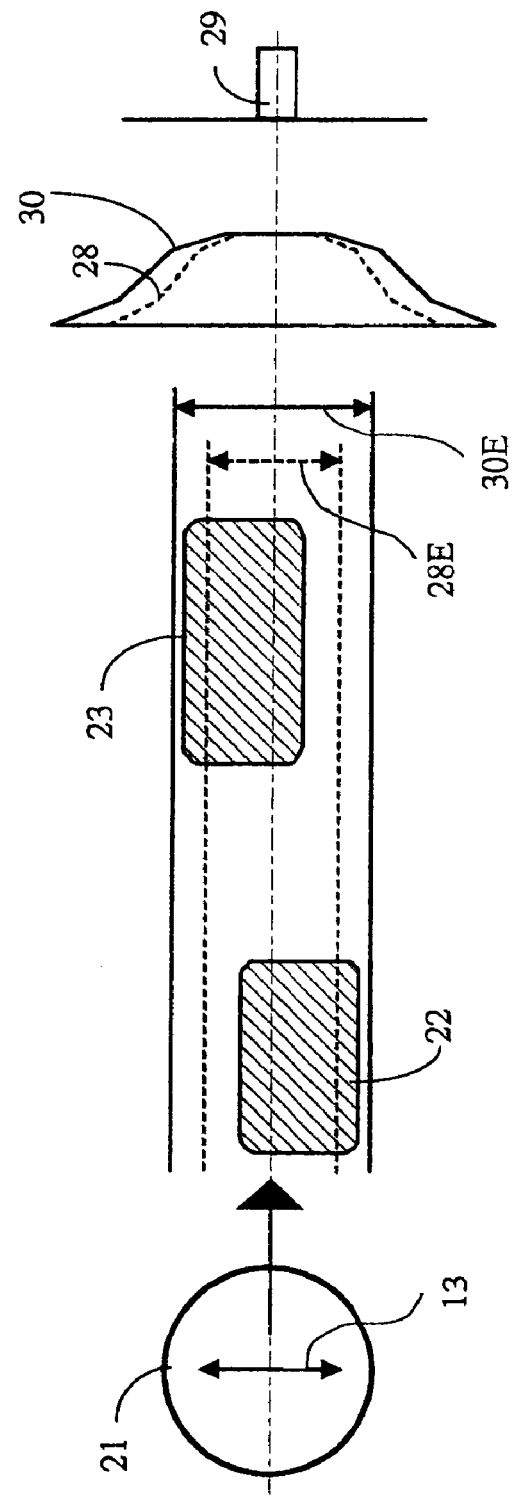

[FIG. 6]
FIG. 6 is a diagram showing the principle of erasure of signal marks in the embodiments of the invention.

Figure 7:
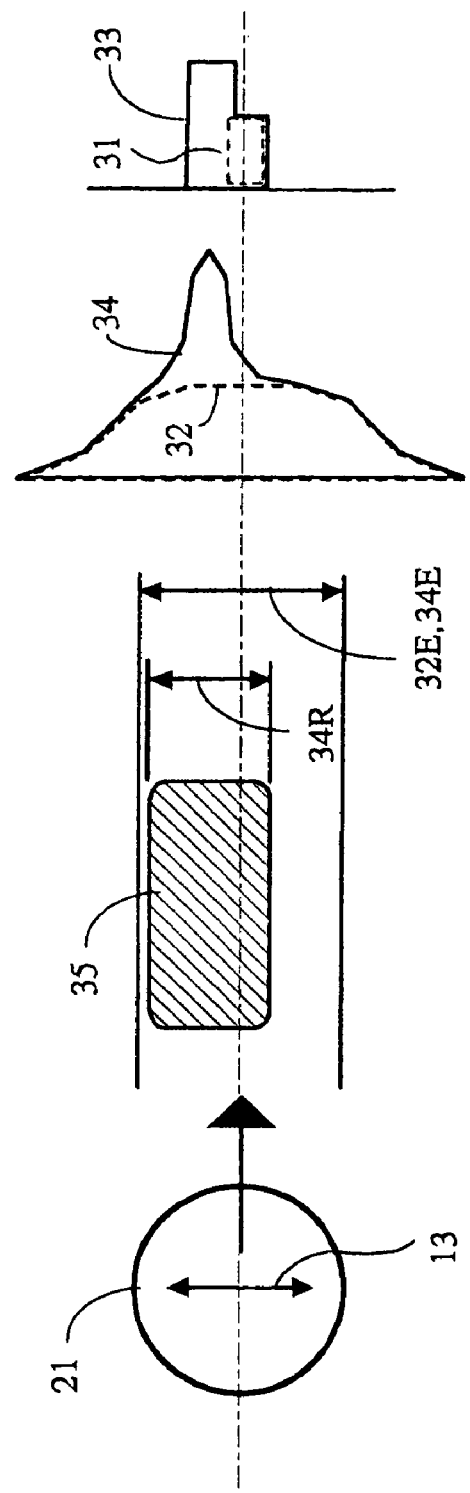

[FIG. 7]
FIG. 7 is a diagram showing the principle of recording (overwriting) of signal marks in the embodiments of the invention.

Figure 8:
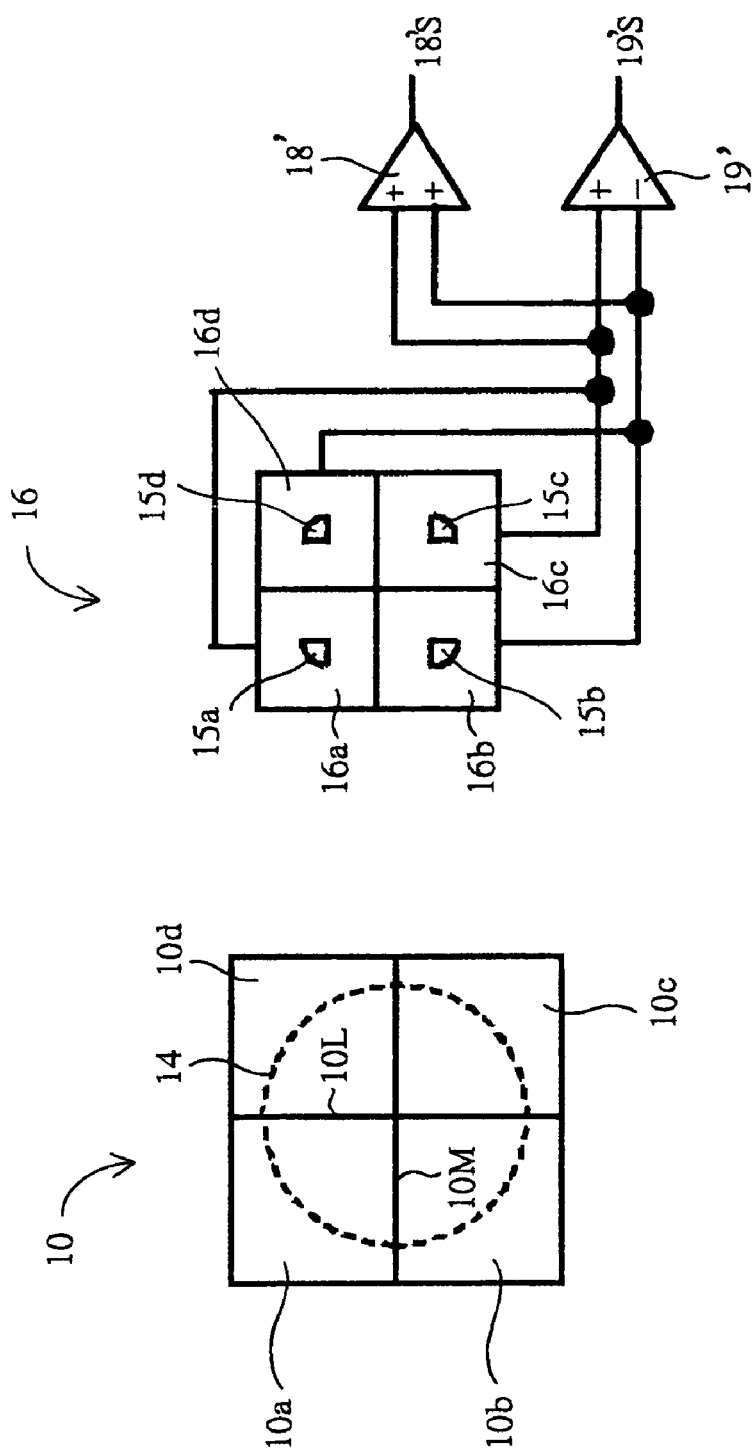

[FIG. 8]
FIG. 8 is a diagram illustrating the appearance of the hologram element and the photo detector in a second embodiment of the invention.

Figure 9:
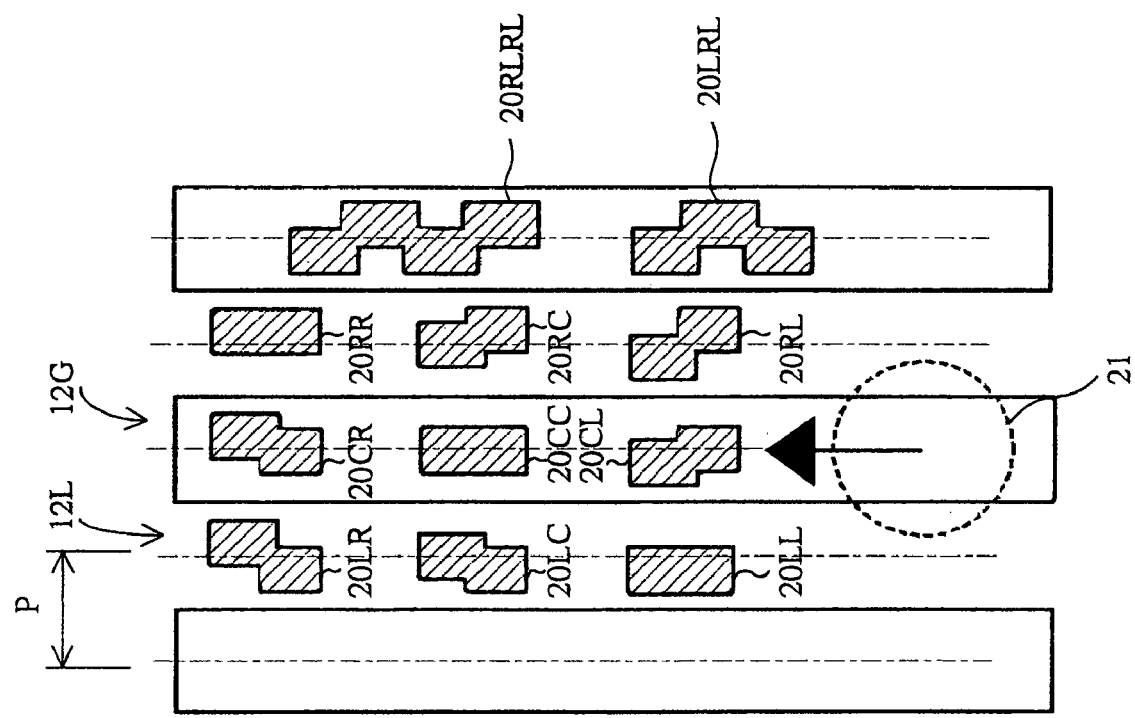

[FIG. 9]
FIG. 9 is a view showing the external shape of the signal marks in the second embodiment of the invention.

Figure 10:
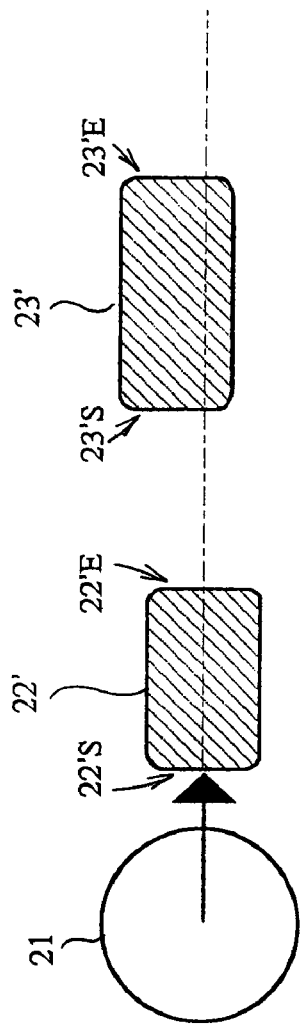
Figure 10:
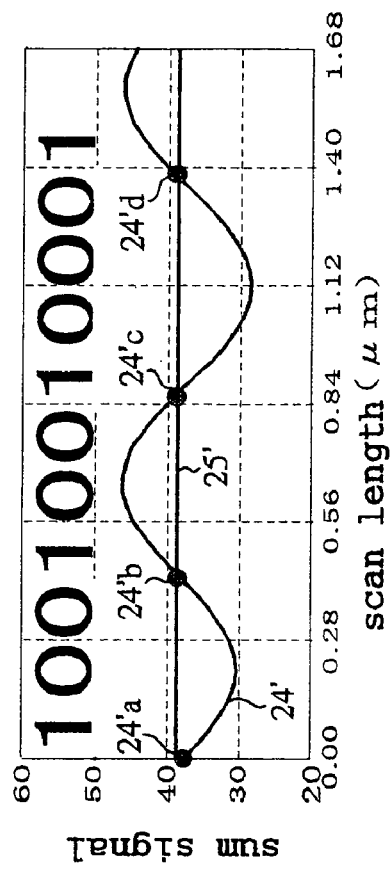
Figure 10:
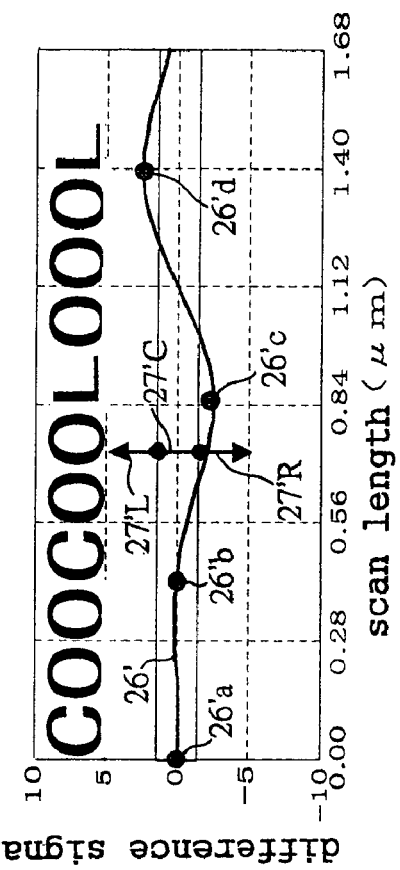

[FIG. 10]
FIG. 10 is a diagram showing the principle of generation of quaternary codes in the second embodiment of the invention.

Figure 11:
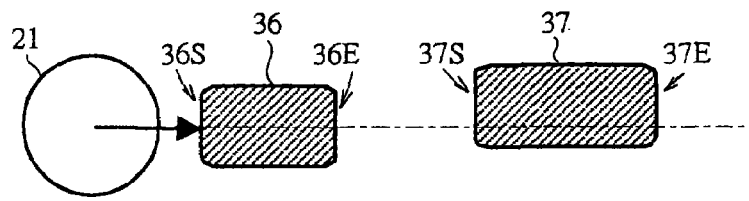
Figure 11:
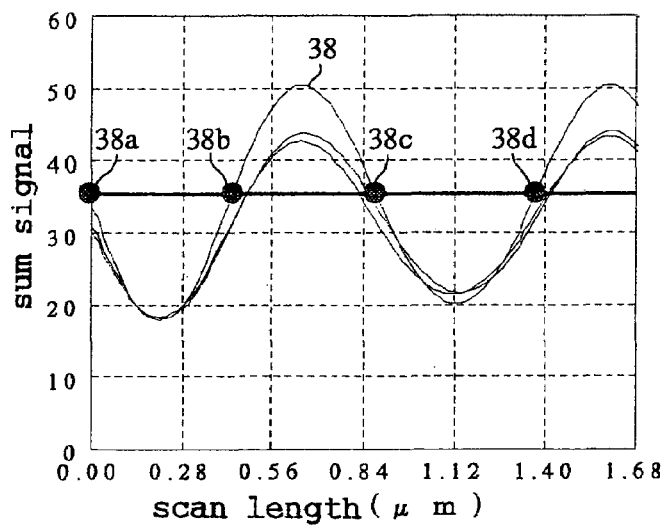
Figure 11:
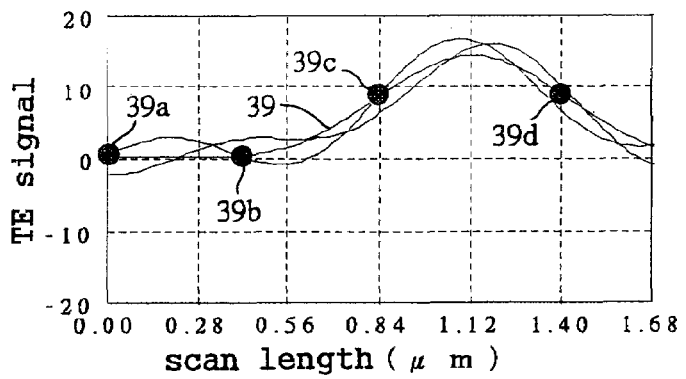
Figure 11:
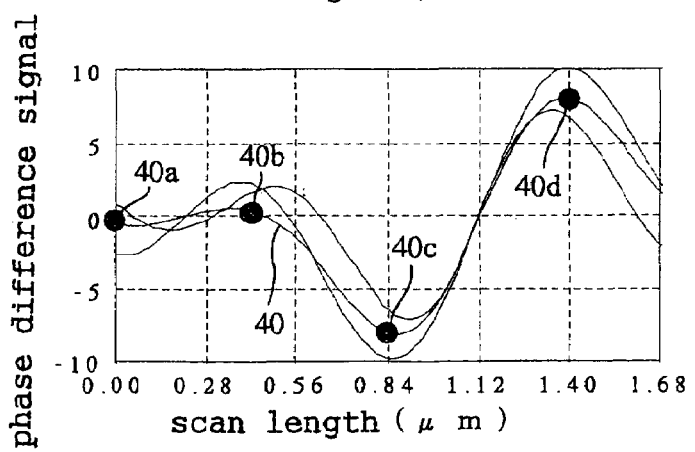

[FIG. 11]
FIG. 11 is a waveform chart of signals in the case where crosstalk occurs in the first and second embodiments of the invention.

Figure 12:
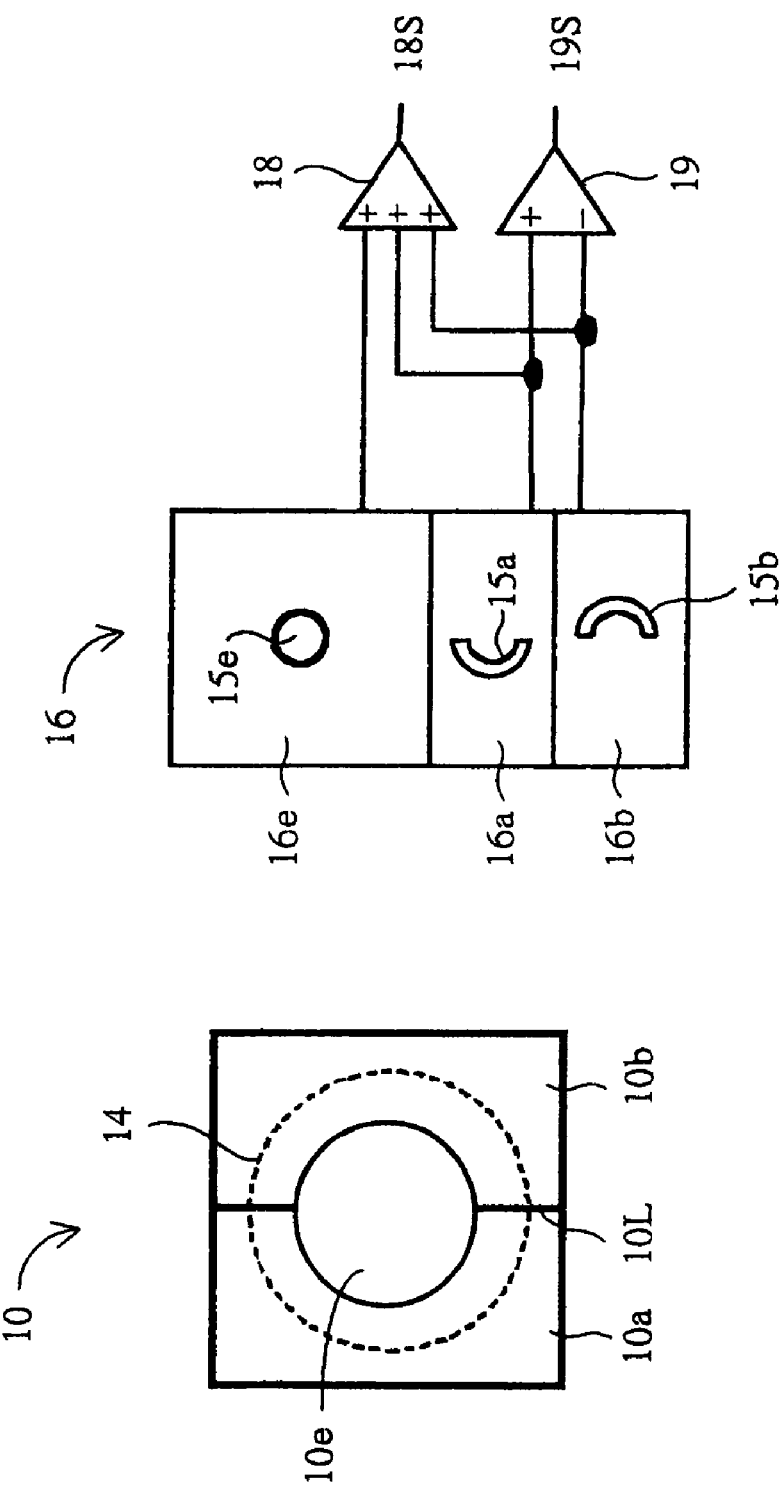

[FIG. 12]
FIG. 12 is a diagram illustrating the appearance of the hologram element and the photo detector in a third embodiment of the invention.

Figure 13:
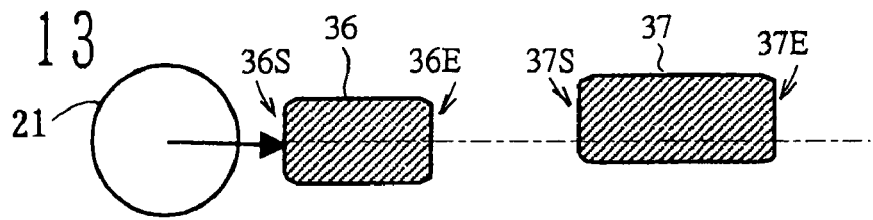
Figure 13:
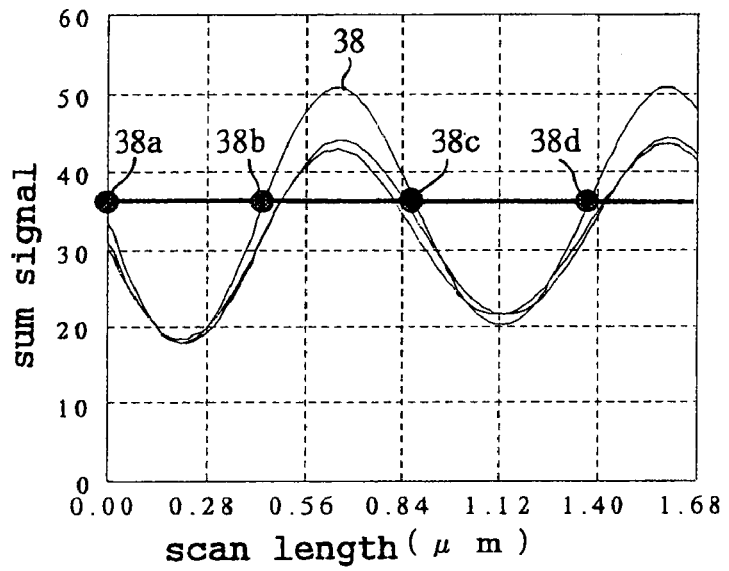
Figure 13:
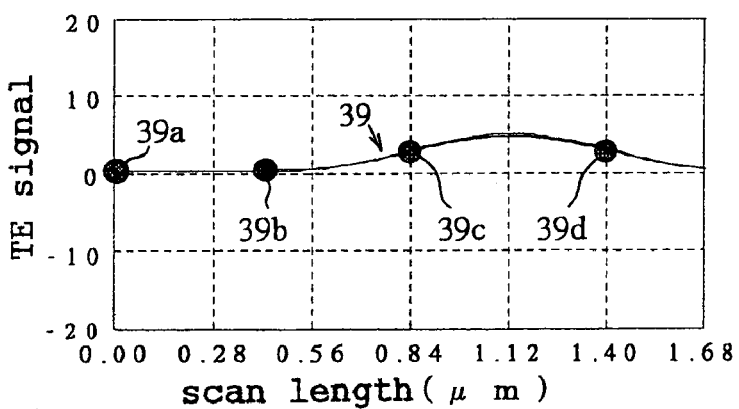
Figure 13:
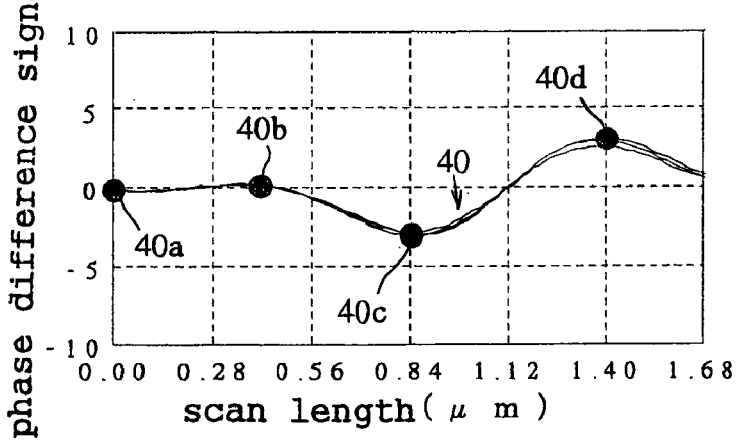

[FIG. 13]
FIG. 13 is a waveform chart of signals in the case where crosstalk occurs in the third and fourth embodiments of the invention.

Figure 14:
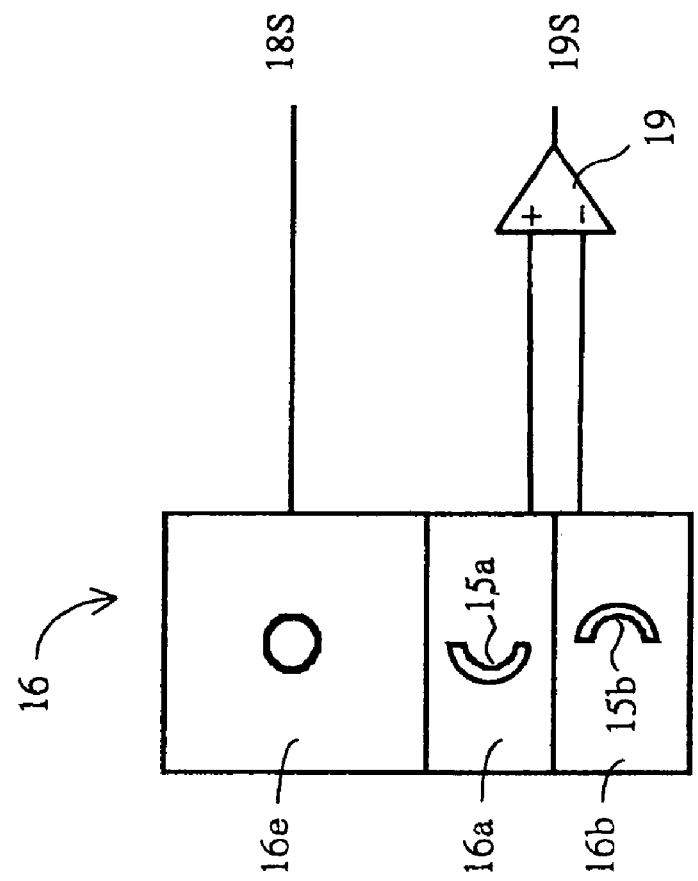
Figure 14:
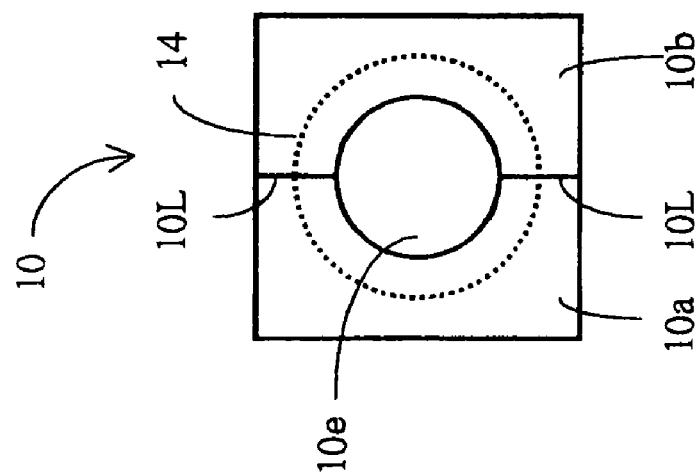

[FIG. 14]
FIG. 14 is a diagram illustrating the appearance of the hologram element and the photo detector in another embodiment of the invention.

Figure 15:
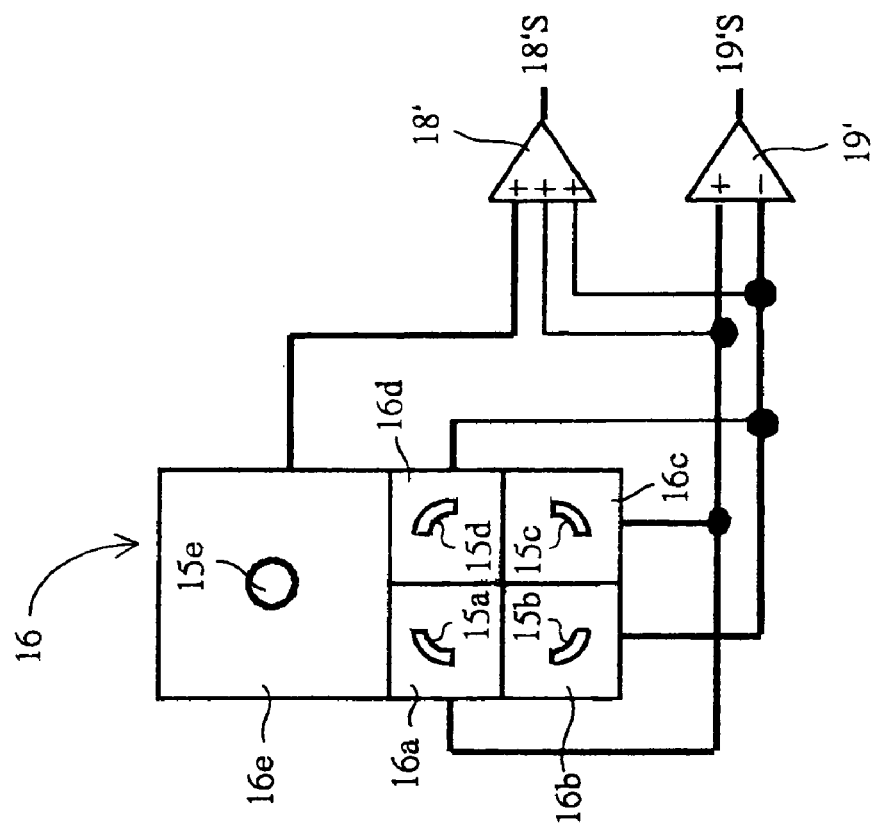
Figure 15:
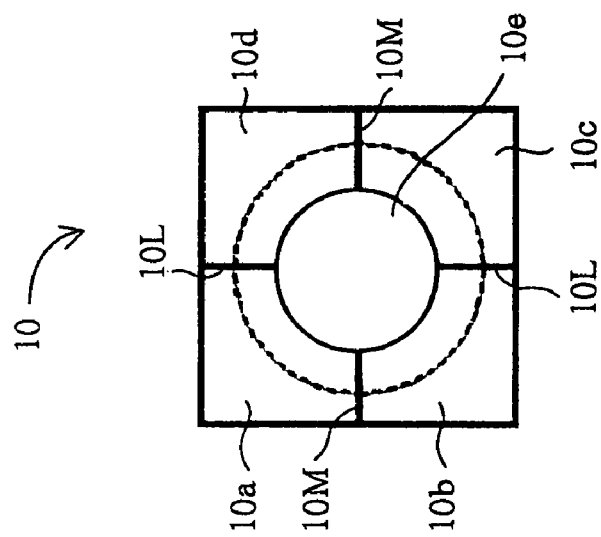

[FIG. 15]
FIG. 15 is a diagram illustrating the appearance of the hologram element and the photo detector in the fourth embodiment of the invention.

Figure 16:
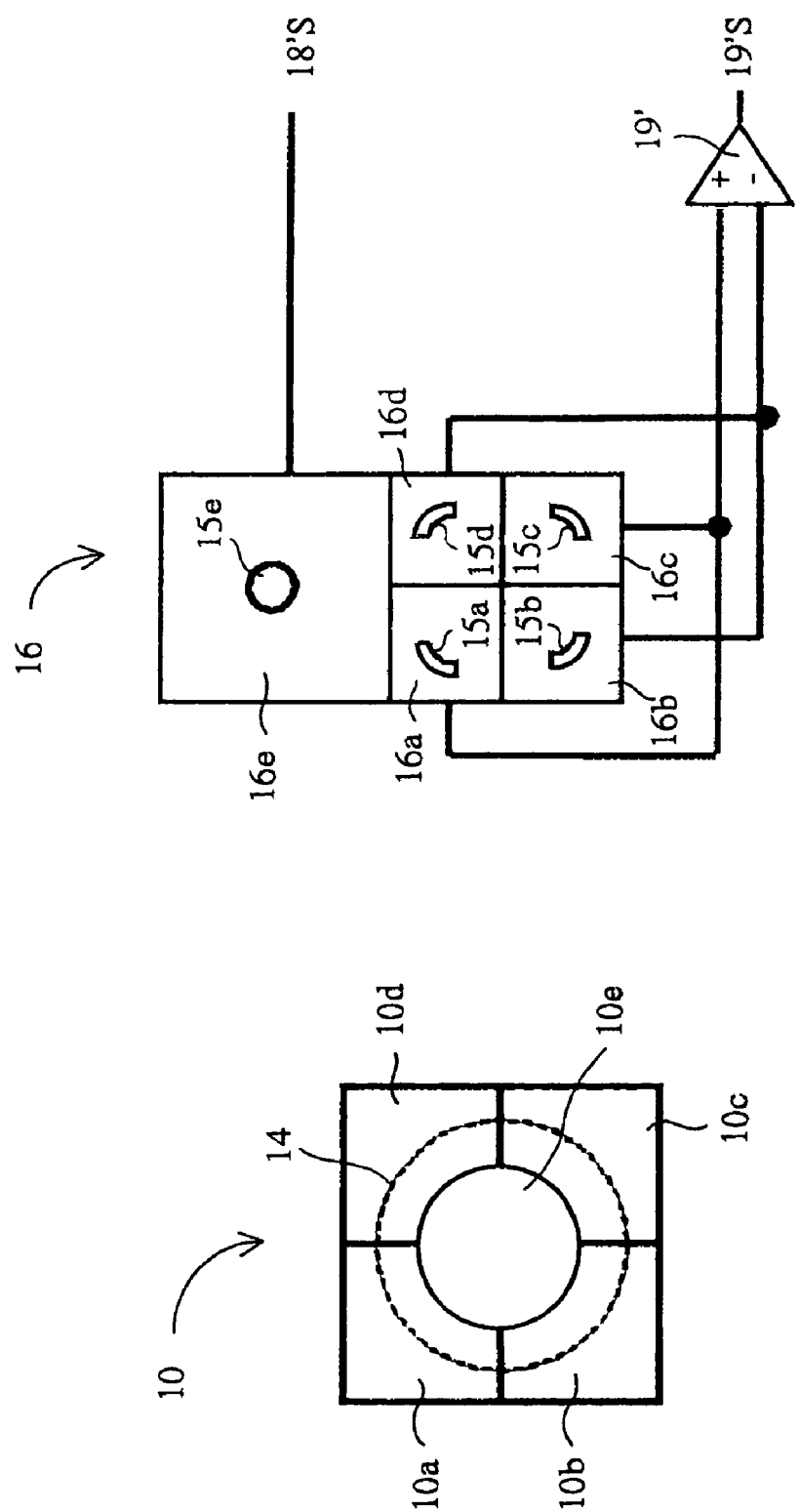

[FIG. 16]
FIG. 16 is a diagram illustrating the appearance of the hologram element and the photo detector in a further embodiment of the invention.

Figure 17:
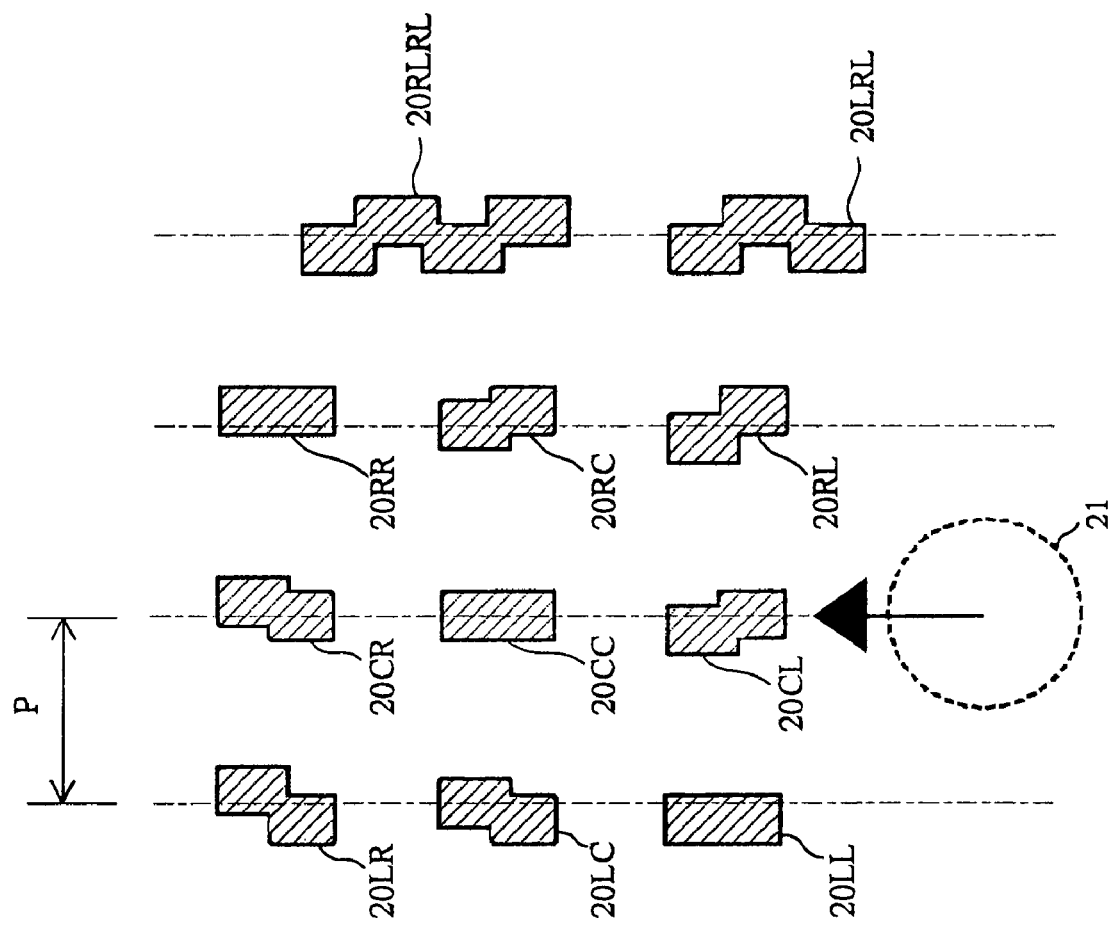

[FIG. 17]
FIG. 17 is a view showing the external shape of signal marks in a fifth embodiment of the invention.

Figure 18:
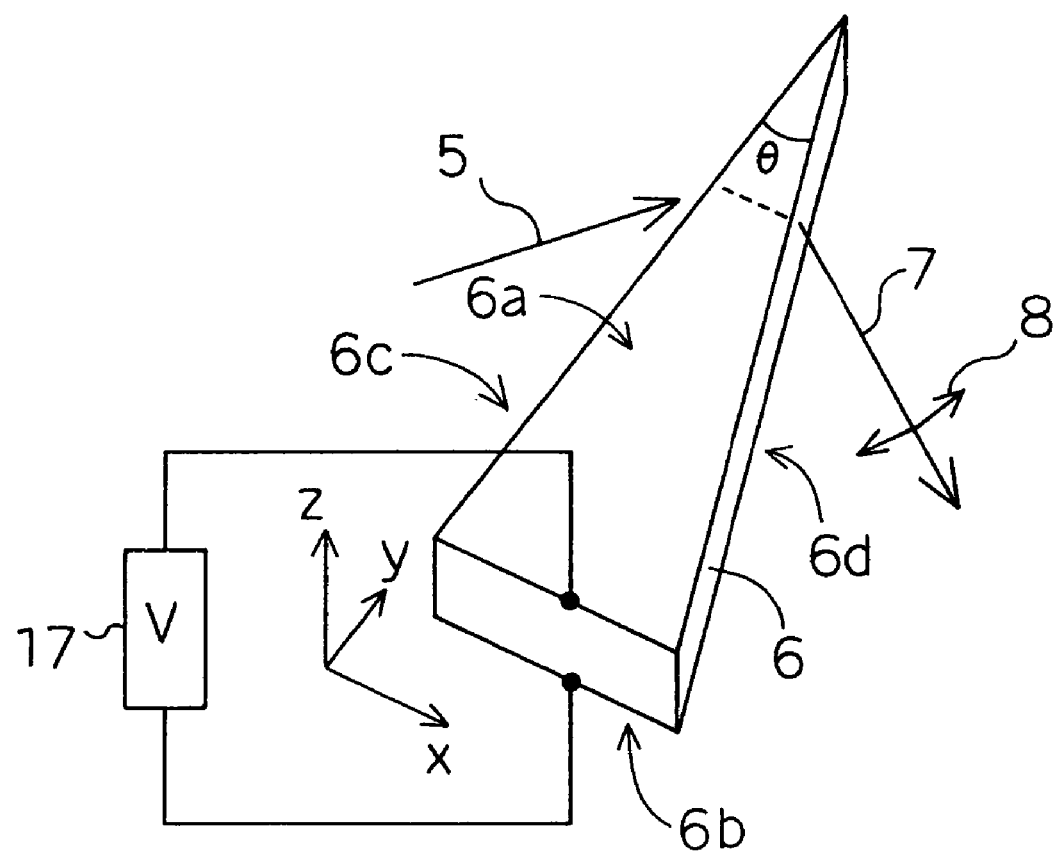

[FIG. 18]
FIG. 18 is a view showing the external configuration of a light deflecting element in a another embodiment of the invention.

Figure 19:
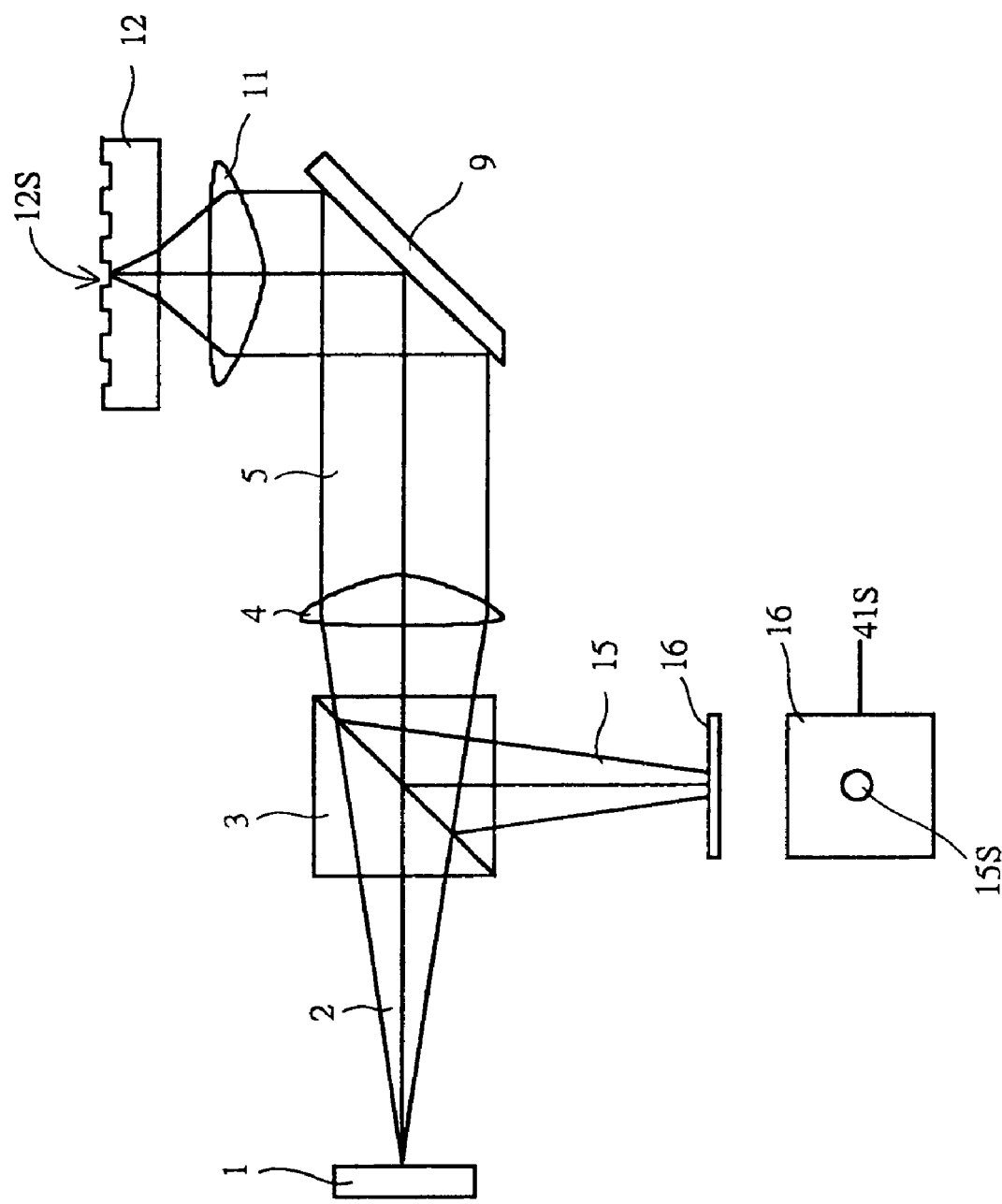

[FIG. 19]
FIG. 19 is a view showing a cross-section configuration of an optical disk device of a conventional art example.

Figure 20:
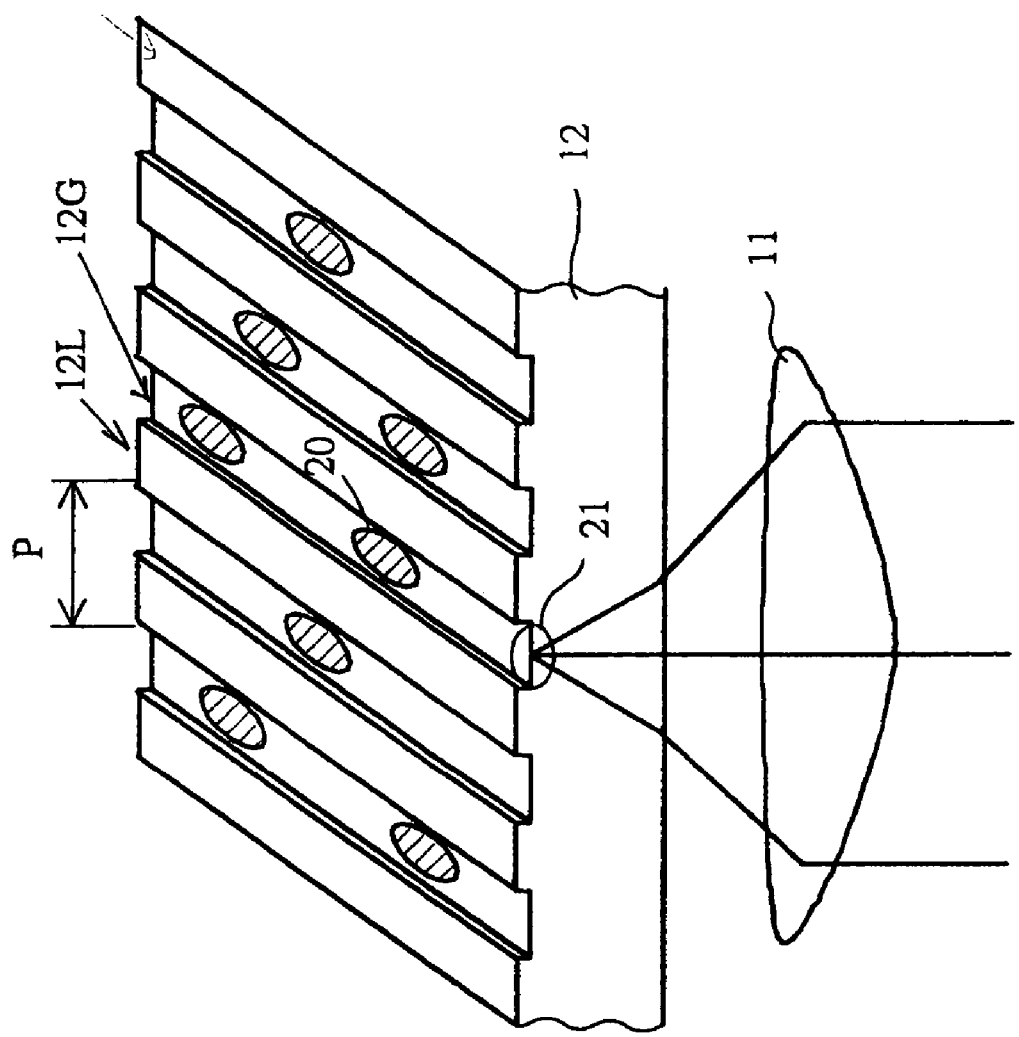

[FIG. 20]
FIG. 20 is a view showing a cross-section configuration of an optical disk which is commonly used in the conventional art example and the embodiments of the invention.

Figure 21:
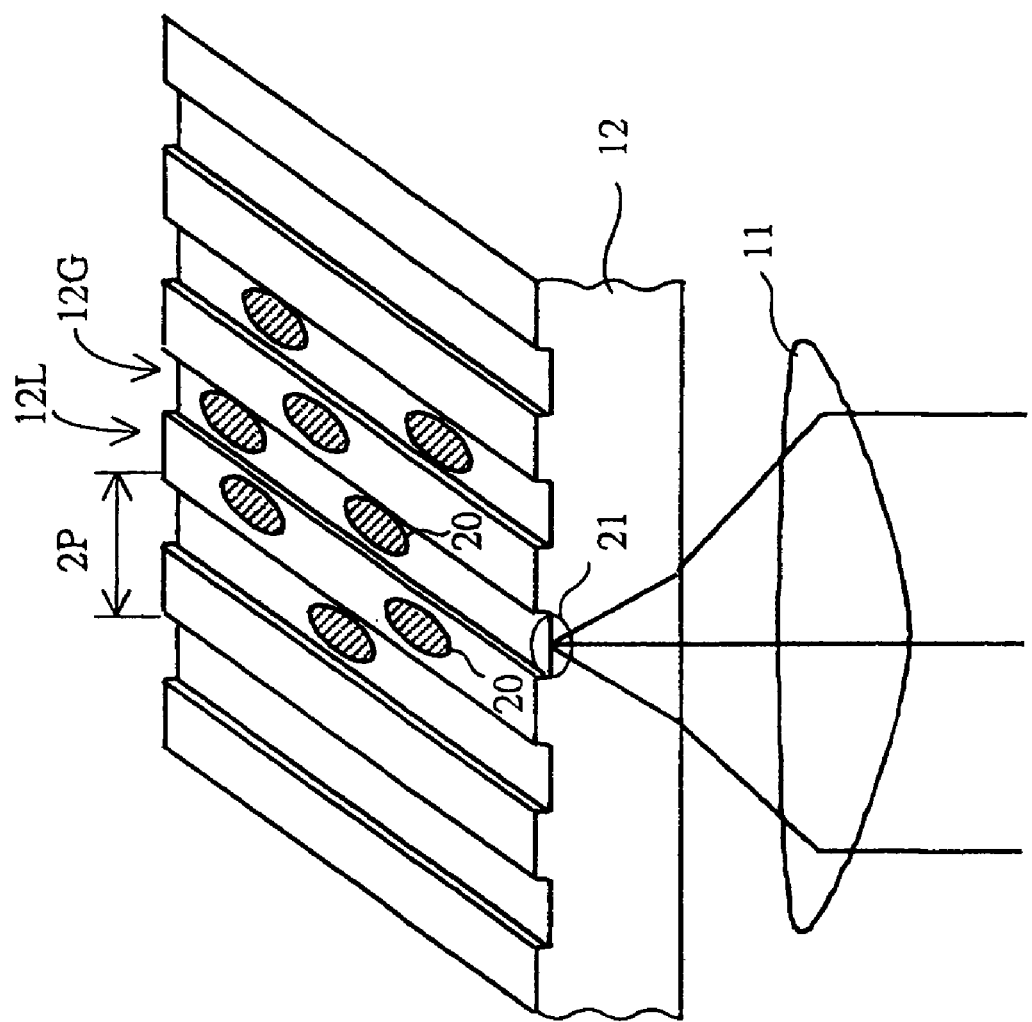

[FIG. 21]
FIG. 21 is a view showing a cross-section configuration of an optical disk which is commonly used in the conventional art example and the embodiments of the invention.

Figure 22:
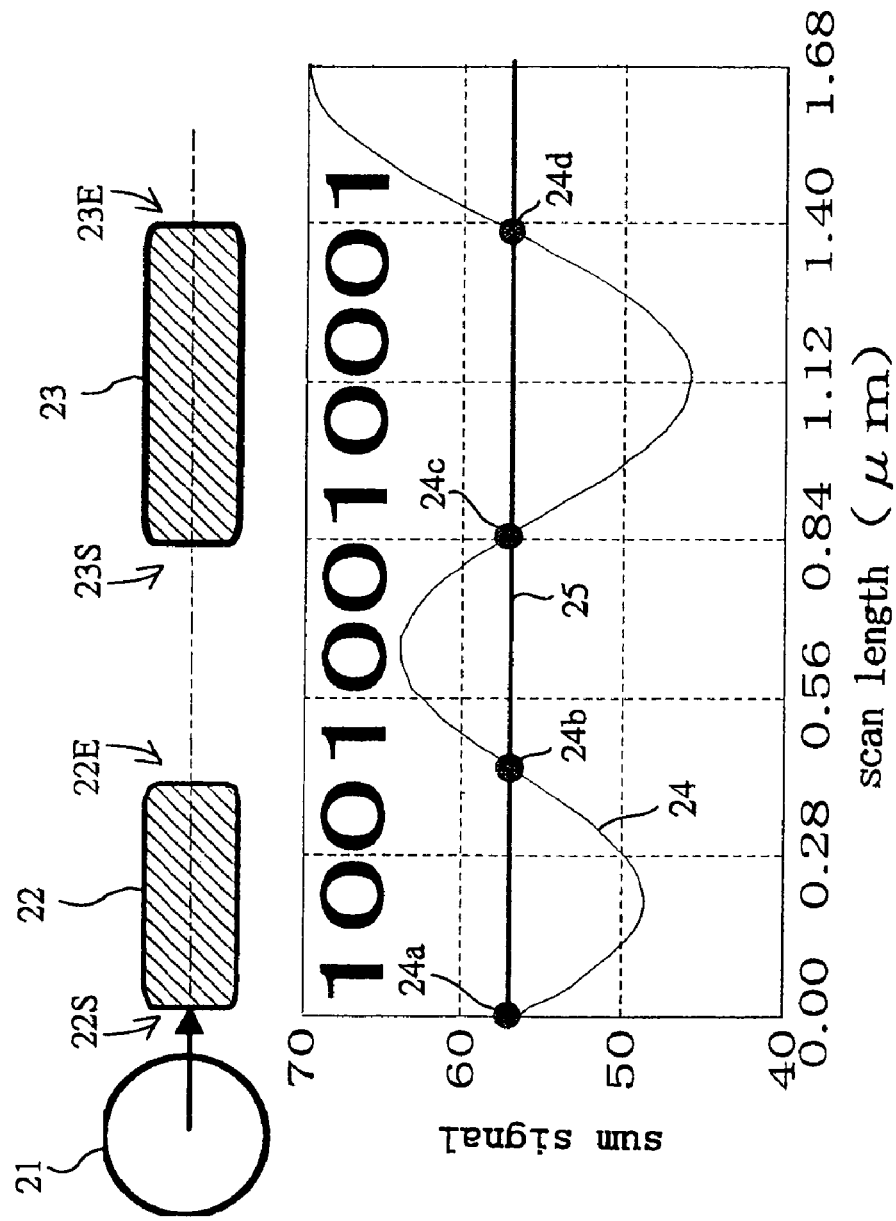

[FIG. 22]
FIG. 22 is a diagram showing the principle of generation of binary codes in the optical disk device of the conventional art example.

DESCRIPTION OF THE REFERENCE NUMERALS AND SIGNS 1 radiation light source
3 beam splitter
4 collimating lens
6 light deflecting element
9 reflecting mirror
10 hologram element
11 objective lens
12 optical disk substrate
12S signal surface
13 direction perpendicular to track
16 photo detector

PREFERRED EMBODIMENTS OF THE INVENTION

Hereinafter, embodiments of the invention will be described with reference to the accompanying drawings.

First Embodiment

Hereinafter, a first embodiment of the invention will be described with reference to FIGS. 1 to 7.

FIG. 1 shows a cross-section configuration of an optical disk device of the first embodiment of the invention. Referring to FIG. 1, light beams 2 emitted from a radiation light source 1 such as a semiconductor laser are transmitted through a beam splitter 3, and then converted into parallel beams 5 by a collimating lens 4. The light beams 5 are transmitted through a light deflecting element 6, reflected by a reflecting mirror 9, transmitted through a hologram element 10, and then converged by an objective lens 11 onto a signal surface 12S on a track formed in the rear face of a optical disk optical disk substrate 12.

A voltage signal is applied to the light deflecting element 6 so that the propagation direction of light beams 7 emitted from the light deflecting element 6 is changed along directions 8 parallel to the sheet, whereby a converged light spot on the signal surface 12S is displaced in directions 13 perpendicular to the tracks. The objective lens 11 and the hologram element 10 are integrated into one unit which is controlled in focusing and tracking directions by an actuator.

The light beams reflected from the signal surface 12S are converged by the objective lens 11 into light beams 14 which are then distributed by the hologram element 10. The distributed beams are light beams 15 which are then reflected by the reflecting mirror 9, transmitted through the light deflecting element 6, passed through the collimating lens 4, reflected by the beam splitter 3, and then incident on a photo detector 16.

The optical disk device further comprises a configuration for detecting a focussing error and a tracking error. However, such a configuration is not directly related to the present invention, and therefore its description is omitted. The hologram element 10 is placed below the objective lens 11. Alternatively, the hologram element 10 may be placed in another position (for example, between the collimating lens 4 and the light deflecting element 6), and means other than the hologram element 10 may be used for distributing light beams. Even when only the hologram element 10 is used, the light beams which are emitted from the light source 1 and then directed toward the optical disk substrate 12 can be separated from those which propagates from the optical disk substrate 12 to the photo detector 16. Therefore, the beam splitter 3 may be omitted.

FIG. 2 shows the external configuration of the light deflecting element 6 in the first embodiment of the invention. As shown in FIG. 2, the light deflecting element 6 has a structure in which electrodes made of Al, Cr, or the like are formed on the surface 6a and the rear face 6b of a crystal plate of, for example, LiNbO$_3$ and exhibiting an electrooptic effect. When a crystal of LiNbO$_3$ is used as the light deflecting element 6, the optical axis of the LiNbO$_3$ crystal is in the z-axis, the light beams propagate along the xy plane, and a voltage driving circuit 17 applies an electric field in the direction of the z-axis.

As seeing in the direction of the z-axis, the crystal plate has a rectangular external shape. A pair of saw-tooth like electrodes 6a1 and 6a2 are opposedly placed on the surface 6a so as to be electrically insulated from each other, and voltages of opposite polarities are applied to the electrodes, respectively. Similarly, a pair of saw-tooth like electrodes 6b1 and 6b2 are opposedly placed on the rear face 6b so as to be electrically insulated from each other, and voltages of opposite polarities are applied to the electrodes, respectively. The electrodes 6b1 and 6b2 are not shown in the figure.

The electrodes 6a1 and 6b1 are opposed to each other, and voltages of opposite polarities are applied to the electrodes, respectively. The light beams 5 which are incident on a side face 6c of the crystal plate are linearly polarized beams in which the electric vector is in the direction along the xy plane (i.e., so-called extraordinary beams). The light beams are incident on the crystal plate with forming a large angle (for example, about 71 deg.) to the normal (x-axis) of the side face.

When the thickness in the z direction of the crystal plate is set to 1 mm and the apex angle θ of the saw-tooth like shape of the electrode pattern is set to about 52 deg., the transmitted beams enter and are then transmitted through boundaries 6e, 6f, and 6g of the electrode patterns existing between the plane of incidence 6c and the plane of emission 6d, at a large angle of incidence (for example, about 26 deg.), and then emit from the plane of emission 6d at the same angle (about 71 deg.) as that in the incidence.

When a varying voltage of ±5 V is applied between the electrodes by the voltage driving circuit 17, the electrooptic effect causes the refractive index to be varied by ±0.000001 with respect to the transmitted beams (extraordinary beams). When the beams are transmitted through the plane of incidence 6c, the plane of emission 6d, and the three boundaries 6e, 6f, and 6g between the planes, therefore, a difference in angle of refraction due to the difference in refractive index occurs, and deflection 8 of about ±0.002 deg. which is synchronized with the varying voltage is generated in the emitted light beams 7.

When the focal length of the objective lens 11 is 3 mm, the angle of deflection corresponds to displacement of ±0.1 μm on the signal surface 12S. Since the response speed of the electrooptic effect is very high, the responsibility is expected to be 1 GHz or higher which corresponds to several tens to hundreds of times the signal band of the optical disk. Alternatively, the crystal plate may have an external shape of, for example, a parallelogram as seeing in the direction of the z-axis. In order to obtain a larger angle of deflection, preferably, the angles of incidence to the plane of incidence, the plane of emission, and the boundary surfaces are made larger.

FIG. 3 is a diagram illustrating the appearance of the hologram element 10 and the photo detector 16 in the first embodiment of the invention. The photo detector 16 is divided into two detectors 16a and 16b. The hologram element 10 is divided into two regions 10a and 10b by a division line 10L which corresponds to the track tangential direction, i.e., the rotation direction of the optical disk substrate 12 (the direction perpendicular to the sheet of FIG. 1).

The division line 10L divides substantially equally the return light beams 14. When the return light beams 14 are transmitted through the regions 10a and 10b, the light path is bent by the diffraction phenomenon of the hologram so that the return light beams are formed into light spots 15a and 15b which are converged on the detectors 16a and 16b, respectively. A sum signal 18S of the spots is produced by an adder 18, and a difference signal 19S (TE signal) is produced by a subtractor 19.

FIG. 4 shows the external shape of the signal marks in the first embodiment of the invention. The signal marks are formed on the grooves 12G as shown in FIG. 20. Even in the case where the length is identical, the signal marks are classified into nine kinds depending on the degrees by which the beginning and the end deviate from the track center.

Specifically, a signal mark 20LL is a mark in which the beginning is left and the end is left, a signal mark 20LC is a mark in which the beginning is left and the end is center, a signal mark 20LR is a mark in which the beginning is left and the end is right, a signal mark 20CL is a mark in which the beginning is center and the end is left, a signal mark 20CC is a mark in which the beginning is center and the end is center, a signal mark 20CR is a mark in which the beginning is center and the end is right, a signal mark 20RL is a mark in which the beginning is right and the end is left, a signal mark 20RC is a mark in which the beginning is right and the end is center, and a signal mark 20RR is a mark in which the beginning is right and the end is right. The lengths of the signal marks in FIG. 4 are mere examples.

For example, the term "left" above means the inner side of the disk with respect to a track, and the term "right" means the outer side of the disk with respect to a track. Alternatively, the term "left" may mean the outer side of the disk with respect to a track, and the term "right" may mean the inner side of the disk with respect to a track.

The positional deviation in a signal mark is not restricted at the beginning or the end, and may be between the beginning and the end. For example, a signal mark 20LRL is a mark in which deviation occurs at one position between the beginning and the end, and a signal mark 20RLRL is a mark in which deviation occurs at two positions between the beginning and the end. Also in the cases, the lengths of the signal marks are mere examples.

When the degree of deviation in the direction perpendicular to the track direction is large, crosstalk is increased. Therefore, the deviation degree is preferably set to be equal to or smaller than ¼ of the track pitch P at the maximum. As a signal mark is shorter, the detection output of a judgment signal (difference signal) of offtrack is lower in level. Therefore, the deviation degree is preferably set to be larger as a signal mark is shorter.

FIG. 5 is a diagram showing the principle of generation of quaternary codes in the first embodiment of the invention. Referring to FIG. 5, it is assumed that both the beginning 22S and the end 22E of the signal mark 22 are deviated to the right side with respect to a track, and both the beginning 23S and the end 23E of the signal mark 23 are deviated to the left side. When the signal marks 22 and 23 are scanned by the converged light spot 21, the sum signal 18S has a signal waveform 24.

When the signal waveform 24 is sliced at an appropriate detection level 25, slice points 24a, 24b, 24c, and 24d are detected at positions corresponding to the beginnings and ends 22S and 22E, and 23S and 23E of the signal marks 22 and 23. It is assumed that code 1 is set at a bit which is immediately after a slice point and code 0 is set at any bit other than such a bit. If the basic unit T (1 bit length) of the signal length is T=0.14 µm, binary codes which are read from the signal waveform 24 are 10010010001 . . . . In this way, signal marks are first converted into binary codes.

When the signal marks 22 and 23 are scanned by the converged light spot 21, the difference signal 19S has a signal waveform 26. The difference signal 19S is sensitive to offtrack of a signal mark, and its polarity depends on the offtracking state. Namely, when the beginning or the end of a signal mark is rightward deviated, the signal is negative, and, when the beginning or the end is leftward deviated, the signal is positive.

In the signal waveform 26, points 26a, 26b, 26c, and 26d are detected at timings corresponding to the slice points 24a, 24b, 24c, and 24d, respectively. In accordance with the output level of each of the points, or whether the output level is not larger than −ε (a region 27R), is within ±ε (a region 27C) or is not smaller than ε (a region 27L), replacement of code 1 is performed in different manners.

For example, it is assumed that, when the detection point of the difference signal is in the region 27R, code 1 is replaced with R, when the point is in the region 27C, code 1 is replaced with C, and, when the point is in the region 27L, code 1 is replaced with L. As a result, codes which are read from the signal waveforms 24 and 26 are R00R00L000L . . . . Although the mark length is identical, therefore, the variety of marks is increased from the binary values (0 and 1) of the conventional art to the quaternary values (0, R, C, and L), and the information density can be accordingly increased.

In the case where the positional deviation is between the beginning and the end as shown in FIG. 4, also 0 can be multi-leveled to R, C, L, and the like, in addition to 1.

FIG. 6 is a diagram showing the principle of erasure of signal marks in the first embodiment of the invention. When scanning of the converged light spot 21 is performed, a heat distribution indicated by a broken line 28 is applied to the vicinity of a track in the direction perpendicular to the track direction. For example, a phenomenon such as that an amorphous portion is crystallized by the heat distribution 28 occurs. As a result, signal marks in a region 28E are erased, but signal marks such as signal marks 22 and 23 which are laterally deviated from the track center remain to be unerased.

To comply with this, by using the light deflecting element 6 which has been described with reference to FIG. 2, the converged light spot 21 in an increased intensity state is displaced at a high frequency (for example, ten or more times faster than the scanning speed of the converged light spot 21) in the directions 13 perpendicular to a track. If the center of the converged light spot 21 is displaced so as to attain an existence probability distribution indicated by a solid line 29, a heat distribution indicated by a solid line 30 is applied to the vicinity of the track. Signal marks in a region 30E are erased by the heat distribution, thereby realizing complete erasure of also the signal marks 22 and 23 which are laterally deviated from the track.

FIG. 7 is a diagram showing the principle of recording (overwriting) of signal marks in the first embodiment of the invention. By using the light deflecting element 6 which has been described with reference to FIG. 2, the converged light spot 21 in an increased intensity state is displaced at a high frequency so as to attain an existence probability distribution indicated by a broken line 31 in the directions 13 perpendicular to the track direction. Then, a heat distribution indicated by a broken line 32 is applied to the vicinity of the track (erasure mode). A phenomenon such as that an amorphous portion is crystallized by the heat distribution 32 occurs so that signal marks in a region 32E are erased.

When the converged light spot 21 in a further increased intensity state is displaced at a high frequency so as to attain an existence probability distribution indicated by a solid line 33, a heat distribution indicated by a slid line 34 is applied to the vicinity of a track (record mode). A phenomenon such as that an amorphous portion is crystallized by the heat distribution 34 occurs so that signal marks in a region 34E are erased, and at the same time a phenomenon such as that crystals melt and are then amorphousized occurs so that a signal mark 35 in a region 34R is recorded.

Namely, the erasure mode and the record mode are repeatedly performed, whereby the signal mark 35 which is laterally deviated from the track center is formed, and at the same time erasure of signal marks in the regions 32E and 34E is realized. In other words, if the time period (staying time period) when the converged light exists in each of positions in the direction perpendicular to the track direction is varied, signal marks which have been already formed on a track can be erased and new signal marks can be formed on the track.

In the first embodiment, the kind of offtrack of a signal mark is judged by using the difference signal 19S. In order to enhance the detection sensitivity, preferably, the signal mark is a phase mark (i.e., a signal which functions in an optically analogous manner as concave and convex pits, and in which the phase term of a complex reflectance ratio that is standardized by a value outside the signal mark is not zero). The amplitude term of the complex reflectance ratio may not be 1 (i.e., the level distribution of the reflectance may be used combinedly with the concave and convex pits).

In a design example, the groove depth is 50 deg. (the length unit: 50λ/720 where λ is the wavelength), and the amplitude of the complex reflectance ratio of a signal mark is 0.7, the phase difference is 90 deg. (when expressed by using the complex reflectance ratio, 0.7 exp(90 i π/180) where i is the imaginary unit). In the first embodiment of the invention, it is assumed that signal marks are formed on grooves as shown in FIG. 20. Alternatively, signal marks may be formed on lands, or may be formed both on grooves and lands as shown in FIG. 21.

Second Embodiment

Next, a second embodiment of the invention will be described with reference to FIGS. 8 to 10. The second embodiment is identical with the first embodiment except the configuration of the hologram element and the photo detector, and the principle of generation of quaternary codes. The description of the identical components is omitted. The second embodiment can be applied to both cases of the phase signal and the density signal.

FIG. 8 is a diagram illustrating the appearance of the hologram element 10 and the photo detector 16 in the second embodiment of the invention. The photo detector 16 is divided into four detectors 16a, 16b, 16c, and 16d. The hologram element 10 is divided into four regions 10a, 10b, 10c, and 10d by division lines 10L and 10M which correspond to the track tangential direction and the direction perpendicular to the track direction, respectively.

The division lines 10L and 10M divide substantially equally the return light beams 14. When the return light beams 14 are transmitted through the regions 10a, 10b, 10c, and 10d, the light path is bent by the diffraction phenomenon of the hologram so that the return light beams are formed into light spots 15a, 15b, 15c, and 15d which are converged on the detectors 16a, 16b, 16c, and 16d, respectively. A sum signal 18'S corresponding to 16a+16b+16c+16d is produced by an adder 18', and a difference signal 19'S (phase difference signal) corresponding to 16a+16c−(16b+16d) is produced by a subtractor 19'.

FIG. 9 shows the external shape of the signal marks in the second embodiment of the invention. The signal marks are formed on the grooves 12G and the lands 12L as shown in FIG. 21. Even in the case where the length is identical, the signal marks are classified into nine kinds depending on the degrees by which the beginning and the end deviate from the track center.

Specifically, a signal mark 20LL is a mark in which the beginning is left and the end is left, a signal mark 20LC is a mark in which the beginning is left and the end is center, a signal mark 20LR is a mark in which the beginning is left and the end is right, a signal mark 20CL is a mark in which the beginning is center and the end is left, a signal mark 20CC is a mark in which the beginning is center and the end is center, a signal mark 20CR is a mark in which the beginning is center and the end is right, a signal mark 20RL is a mark in which the beginning is right and the end is left, a signal mark 20RC is a mark in which the beginning is right and the end is center, and a signal mark 20RR is a mark in which the beginning is right and the end is right.

The positional deviation in a signal mark is not restricted at the beginning or the end, and may be between the beginning and the end. For example, a signal mark 20LRL is a mark in which deviation occurs at one position between the beginning and the end, and a signal mark 20RLRL is a mark in which deviation occurs at two positions between the beginning and the end. Preferably, the deviation degree is set to be equal to or smaller than ¼ of the track pitch P at the maximum. As a signal mark is shorter, the detection output of a judgment signal (difference signal) of offtrack is lower in level. Therefore, the deviation degree is preferably set to be larger as a signal mark is shorter.

FIG. 10 is a diagram showing the principle of generation of quaternary codes in the second embodiment of the invention. Referring to FIG. 10, it is assumed that both the beginning 22'S and the end 22'E of the signal mark 22' are center or over the track center, and both the beginning 23'S and the end 23'E of the signal mark 23' are deviated to the left side with respect to the track center. When the signal marks 22' and 23' are scanned by the converged light spot 21, the sum signal 18'S has a signal waveform 24'.

When the signal waveform 24' is sliced at an appropriate detection level 25', slice points 24'a, 24'b, 24'c, and 24'd are detected at positions corresponding to the beginnings and ends 22'S and 22'E, and 23'S and 23'E of the signal marks 22' and 23'. It is assumed that code 1 is set at a bit which is immediately after a slice point and code 0 is set at any bit other than such a bit. If the basic unit T (1 bit length) of the signal length is T=0.14 μm, binary codes which are read from the signal waveform 24' are 10010010001 . . . . In this way, signal marks are first converted into binary codes.

When the signal marks 22' and 23' are scanned by the converged light spot 21, the difference signal 19'S has a signal waveform 26'. The difference signal 19'S is sensitive to offtrack of a signal mark, and its polarity depends on the offtracking state. Namely, when the beginning of a signal mark is rightward deviated, the signal is positive, and when the beginning is leftward deviated, the signal is negative. When the end of a signal mark is rightward deviated, the signal is negative, and when the end is leftward deviated, the signal is positive. In both the case where marks are density marks and that where marks are phase marks, the same positive and negative relationships are attained.

In the signal waveform 26', points 26'a, 26'b, 26'c, and 26'd are detected at timings corresponding to the slice points 24'a, 24'b, 24'c, and 24'd. In accordance with a combination of the output level of each of the points, or whether the output level is not larger than −ε (a region 27'R), is within ±ε (a region 27'C), or is not smaller than ε (a region 27'L), and whether the point corresponds to the beginning of the signal mark or the end (in other words, the inclination of the signal waveform 24' at the slice point 24'a, 24'b, 24'c, or 24'd is positive or negative), replacement of code 1 is performed in different manners.

For example, it is assumed that, in the case where the inclination of the signal waveform 24' is negative, when the detection point of the difference signal is in the region 27'R, code 1 is replaced with R, when the point is in the region 27'C, code 1 is replaced with C, and, when the point is in the region 27'L, code 1 is replaced with L. Furthermore, it is assumed that, in the case where the inclination of the signal waveform 24' is positive, when the detection point of the difference signal is in the region 27'R, code 1 is replaced with L, when the point is in the region 27'C, code 1 is replaced with C, and, when the point is in the region 27'L, code 1 is replaced with R.

As a result, codes which are read from the signal waveforms 24' and 26' are C00C00R000R . . . . Although the mark length is identical, therefore, the variety of marks is increased from the binary values (0 and 1) of the conventional art to the quaternary values (0, R, C, and L), and the information density can be accordingly increased.

The principles of erasure of signal marks, and recording (overwriting) of signal marks in the second embodiment are identical with those of the first embodiment which have been described with reference to FIGS. 6 and 7, and hence their description is omitted.

In the case where signal marks are formed on grooves and lands, preferably, the marks are density marks (i.e., the phase term of a complex reflectance ratio which is standardized to a value outside the signal mark is zero or at least equal to or smaller than 30 deg.) In the case where signal marks are formed on grooves or lands, the marks may be phase marks (i.e., a signal which functions in an optically analogous manner as concave and convex pits, and in which the phase term of a complex reflectance ratio that is standardized by a value outside the signal mark is not zero) in place density marks. In the second embodiment of the invention, signal marks are formed on grooves and lands as shown in FIG. 21. Alternatively, signal marks may be formed on grooves or lands as shown in FIG. 20.

FIG. 11 shows signal waveforms in the case where crosstalk occurs in the first and second embodiments. In FIG. 11, it is assumed that both the beginning 36S and the end 36E of a signal mark 36 are center or over the track center, and both the beginning 37S and the end 37E of a signal mark 37 are leftward deviated.

In the case where there is no signal mark in adjacent tracks, when the signal marks 36 and 37 are scanned by the converged light spot 21, the sum signal 18S (or 18'S) has a signal waveform 38, the difference signal 19S (see FIG. 3) due to the TE signal has a signal waveform 39, and the difference signal 19S' (see FIG. 8) due to the phase difference signal has a signal waveform 40.

Based on slice points 38a, 38b, 38c, and 38d, points 39a, 39b, 39c, and 39d, and 40a, 40b, 40c, and 40d of the difference signals are detected in the procedures which have been described with reference to FIGS. 3 and 8.

In FIG. 11, two signal waveforms 39' and 39", or 40' and 40" in the case where there is a signal mark in adjacent tracks and crosstalk occurs are superimposingly shown. As seen from the waveforms 39', 39", 40', and 40", crosstalk exerts very large influence on the difference signals, and hence outputs at detection points are largely varied.

In judgment of the offtrack state of a signal mark (whether the signal mark is center, right, or left), therefore, the possibility of erroneous discrimination is large. The invention which can solve this problem will be described in the following embodiments.

Third Embodiment

Next, a third embodiment of the invention will be described with reference to FIGS. 12 and 13. The third embodiment is identical with the first embodiment except the configuration of the hologram element and the photo detector. The description of the identical components is omitted.

FIG. 12 is a diagram illustrating the appearance of the hologram element 10 and the photo detector 16 in the third embodiment of the invention. The photo detector 16 is divided into three detectors 16a, 16b, and 16e. The hologram element 10 is divided into an inner circular region 10e, and outer regions 10a and 10b.

The region 10e occupies the inner peripheral side of the return light beams 14, and the regions 10a and 10b occupy the outer peripheral side of the return light beams 14 with substantially equally dividing the side by means of the division line 10L which corresponds to the track tangential direction. When the return light beams 14 are transmitted through the regions 10a, 10b, and 10e, the light path is bent by the diffraction phenomenon of the hologram so that the return light beams are formed into light spots 15a, 15b, and 15e which are converged on the detectors 16a, 16b, and 16e, respectively. A sum signal 18S corresponding to 16a+16b+16e is produced by the adder 18, and a difference signal 19S (TE signal) corresponding to 16a−16b is detected by the subtractor 19. Namely, the difference signal which is not related to the inner region is used.

Preferably, the diameter of the circular region 10e is set not to be smaller than 60% of wavelength/(pitch of grooves) reduced to a numerical aperture. When the pitch of grooves is 0.74 μm and the wavelength is 0.66 μm, the numerical aperture is 0.55 or more.

FIG. 13 shows signal waveforms in the case where crosstalk occurs in the third embodiment of the invention. In FIG. 13, it is assumed that both the beginning 36S and the end 36E of a signal mark 36 are center or over the track center, and both the beginning 37S and the end 37E of a signal mark 37 are leftward deviated. In the case where there is no signal mark in adjacent tracks, when the signal marks 36 and 37 are scanned by the converged light spot 21, the sum signal 18S has a signal waveform 38, and the difference signal 19S due to the TE signal has a signal waveform 39.

Based on slice points 38a, 38b, 38c, and 38d, points 39a, 39b, 39c, and 39d of the difference signals are detected in the procedures which have been described with reference to FIG. 3. In FIG. 13, two signal waveforms in the case where there is a signal mark in adjacent tracks and crosstalk occurs are superimposingly shown. The waveforms substantially overlap with each other, so that crosstalk due to the TE signal exerts little influence on the difference signals, and outputs at detection points are hardly varied. In judgment of the offtrack state of a signal mark, therefore, the possibility of erroneous discrimination is very small.

As shown in FIG. 14, the sum signal 18S may be a detection signal corresponding to 16e. The regions 10a and 10b are set to be outside the circular region. Alternatively, the regions may be in any position as far as they are in the outer peripheral region of the return light beams 14.

Fourth Embodiment

Next, a fourth embodiment of the invention will be described with reference to FIGS. 13 and 15. The fourth embodiment is identical with the second embodiment except the configuration of the hologram element and the photo detector. The description of the identical components is omitted.

FIG. 15 is a diagram illustrating the appearance of the hologram element 10 and the photo detector 16 in the fourth embodiment of the invention. The photo detector 16 is divided into five detectors 16a, 16b, 16c, 16d, and 16e. The hologram element 10 is divided into an inner circular region 10e, and outer regions 10a, 10b, 10c, and 10d.

The region 10e occupies the inner peripheral side of the return light beams 14, and the regions 10a, 10b, 10c, and 10d occupy the outer peripheral side of the return light beams 14 with substantially equally dividing the side by means of the division lines 10L and 10M which correspond to the track tangential direction and the direction perpendicular to the track direction, respectively. When the return light beams 14 are transmitted through the regions 10a, 10b, 10c, 10d, and 10e, the light path is bent by the diffraction phenomenon of the hologram so that the return light beams are formed into light spots 15a, 15b, 15c, 15d, and 15e which are converged on the detectors 16*a*, 16*b*, 16*c*, 16*d*, and 16*e*, respectively. A sum signal 18'S of the spots corresponding to 16*a*+16*b*+16*c*+16*d*+16*e* is produced by the adder 18', and a difference signal 19'S (phase difference signal) corresponding to 16*a*+16*c*−(16*b*+16*d*) is produced by the subtractor 19'. Preferably, the diameter of the circular region 10*e* is set not to be smaller than 60% of wavelength/(pitch of grooves) reduced to a numerical aperture.

FIG. 13 shows signal waveforms in the case where crosstalk occurs in the fourth embodiment of the invention. In the case where there is no signal mark in adjacent tracks, when the signal marks 36 and 37 are scanned by the converged light spot 21, the sum signal 18'S has the signal waveform 38, and the difference signal 19'S due to the phase difference signal has the signal waveform 40. Based on slice points 38*a*, 38*b*, 38*c*, and 38*d*, points 40*a*, 40*b*, 40*c*, and 40*d* of the difference signal are detected in the procedures which have been described with reference to FIG. 8.

In FIG. 13, two signal waveforms in the case where there is a signal mark in adjacent tracks and crosstalk occurs are superimposingly shown. Crosstalk exerts little influence on the difference signals, and outputs at detection points are hardly varied. In judgment of the offtrack state of a signal mark, therefore, the possibility of erroneous discrimination is very small.

As shown in FIG. 16, the sum signal 18'S may be a detection signal corresponding to 16*e*. The regions 10*a*, 10*b*, 10*c*, and 10*d* are set to be outside the circular region. Alternatively, the regions may be in any position as far as they are in the outer peripheral region of the return light beams 14.

Fifth Embodiment

Next, a fifth embodiment of the invention will be described. The fifth embodiment is directed to a case where a signal surface has a different section shape, such as a CD in which no groove is formed. The other configuration is identical with that of any one of the first to fourth embodiments, and the description of the identical components is omitted. FIG. 17 shows the external shape of the signal marks in the fifth embodiment of the invention. The signal marks are formed on a plane. Even in the case where the length is identical, the signal marks are classified into nine kinds depending on the degrees by which the beginning and the end deviate from the track center.

Specifically, a signal mark 20LL is a mark in which the beginning is left and the end is left, a signal mark 20LC is a mark in which the beginning is left and the end is center, a signal mark 20LR is a mark in which the beginning is left and the end is right, a signal mark 20CL is a mark in which the beginning is center and the end is left, a signal mark 20CC is a mark in which the beginning is center and the end is center, a signal mark 20CR is a mark in which the beginning is center and the end is right, a signal mark 20RL is a mark in which the beginning is right and the end is left, a signal mark 20RC is a mark in which the beginning is right and the end is center, and a signal mark 20RR is a mark in which the beginning is right and the end is right. The positional deviation in a signal mark is not restricted at the beginning or the end, and may be between the beginning and the end.

For example, a signal mark 20LRL is a mark in which deviation occurs at one position between the beginning and the end, and a signal mark 20RLRL is a mark in which deviation occurs at two positions between the beginning and the end. Preferably, the deviation degree is set to be equal to or smaller than ¼ of the track pitch P at the maximum. Preferably, the signal mark is a phase mark (i.e., a signal which functions in an optically analogous manner as concave and convex pits, and in which the phase term of a complex reflectance ratio that is standardized by a value outside the signal mark is not zero). The phase term is optimumly set to about 180 deg. (corresponding to a pit of a depth of λ/4). When the optical disk device is restricted to a device of the reproduction-only type, phase marks are configured by pits, and the light deflecting element which has been described with reference to FIG. 2 is not necessary.

In the above, the first to fifth embodiments have been described. The embodiments may be variously modified by, for example, combining a part of one of the embodiments with another embodiment. The example in which code 1 is replaced with three code values of R, C, and L has been described. When the number of the detection levels (27R, 27*c*, 27L, and the like) are increased, it is possible to perform replacement of three or more values.

Since the multi-leveling is performed on code 1, a modulation system in which code 1 appears at a higher frequency is preferably used in order to increase the information density. For example, a modulation system (such as the 17 modulation) in which the shortest mark is expressed by 2 bits (in other words, the minimum continuation of bit information code 0 is 1) is used more preferably than EFM or EFP-plus in which the shortest mark is expressed by 3 bits.

Specifically, assuming that the minimum continuation of bit information code 0 is 1 and m is a three-level code of R, C, or L, the variety of 9-bit codes (modulated bits) will be counted. In order to satisfy the conditions that two or more codes m are contained in 9 bits and the minimum continuation of bit information code 0 is 1, the last bit of the 9 bits is fixed to 0.

| Code arrangement | Number of variety |
|---|---|
| m000000m0 | 3 × 3 = 9 |
| 0m00000m0 | 3 × 3 = 9 |
| 00m0000m0 | 3 × 3 = 9 |
| 000m000m0 | 3 × 3 = 9 |
| 0000m00m0 | 3 × 3 = 9 |
| 00000m0m0 | 3 × 3 = 9 |
| m00000m00 | 3 × 3 = 9 |
| 0m0000m00 | 3 × 3 = 9 |
| 00m000m00 | 3 × 3 = 9 |
| 000m00m00 | 3 × 3 = 9 |
| 0000m0m00 | 3 × 3 = 9 |
| m0000m000 | 3 × 3 = 9 |
| 0m000m000 | 3 × 3 = 9 |
| 00m00m000 | 3 × 3 = 9 |
| 000m0m000 | 3 × 3 = 9 |
| m000m0000 | 3 × 3 = 9 |
| 0m00m0000 | 3 × 3 = 9 |
| 00m0m0000 | 3 × 3 = 9 |
| m00m00000 | 3 × 3 = 9 |
| 0m0m00000 | 3 × 3 = 9 |
| m0m000000 | 3 × 3 = 9 |
| m0000m0m0 | 3 × 3 × 3 = 27 |
| 0m000m0m0 | 3 × 3 × 3 = 27 |
| 00m00m0m0 | 3 × 3 × 3 = 27 |
| 000m0m0m0 | 3 × 3 × 3 = 27 |
| m000m00m0 | 3 × 3 × 3 = 27 |
| 0m00m00m0 | 3 × 3 × 3 = 27 |
| 00m0m00m0 | 3 × 3 × 3 = 27 |
| m00m000m0 | 3 × 3 × 3 = 27 |
| 0m0m000m0 | 3 × 3 × 3 = 27 |
| m0m0000m0 | 3 × 3 × 3 = 27 |
| m000m0m00 | 3 × 3 × 3 = 27 |
| 0m00m0m00 | 3 × 3 × 3 = 27 |

-continued

| Code arrangement | Number of variety |
|---|---|
| 00m0m0m00 | 3 × 3 × 3 = 27 |
| m00m00m00 | 3 × 3 × 3 = 27 |
| 0m0m0m00 | 3 × 3 × 3 = 27 |
| m0m000m00 | 3 × 3 × 3 = 27 |
| m00m0m000 | 3 × 3 × 3 = 27 |
| 0m0m0m000 | 3 × 3 × 3 = 27 |
| m0m00m000 | 3 × 3 × 3 = 27 |
| m0m0m0000 | 3 × 3 × 3 = 27 |
| m00m0m0m0 | 3 × 3 × 3 × 3 = 81 |
| 0m0m0m0m0 | 3 × 3 × 3 × 3 = 81 |
| m0m00m0m0 | 3 × 3 × 3 × 3 = 81 |
| m0m0m00m0 | 3 × 3 × 3 × 3 = 81 |
| m0m0m0m00 | 3 × 3 × 3 × 3 = 81 |

The total sum of the number of variety the 9 bits is 1,134 and larger than the tenth power of 2 (=1,024). Therefore, 9 modulated bits have information corresponding to 10 information bits. In the 17 modulation of a binary code, usually, 6 modulated bits correspond to 4 information bits. When code m is replaced with three values as in the invention, therefore, the density can be increased by 6/4×10/9=1.667 times.

In the first to fifth embodiments, the light deflecting element 6 which has been described with reference to FIG. 2 is used. Alternatively, the light deflecting element may have the form shown in FIG. 18. As shown in FIG. 18, the light deflecting element 6 has a structure in which electrodes made of Al, Cr, or the like are formed on the surface 6a and the rear face 6b of a crystal plate of, for example, $LiNbO_3$ and exhibiting an electrooptic effect. When a crystal of $LiNbO_3$ is used as the light deflecting element, the optical axis of the $LiNbO_3$ crystal is in the z-axis, the light beams propagate along the xy plane, and the voltage driving circuit 17 applies an electric field in the direction of the z-axis.

As seeing in the direction of the z-axis, the crystal plate has a triangular external shape. Voltages of opposite polarities are applied to the surface 6a and the rear face 6b, respectively. The light beams 5 which are incident on a side face 6c of the crystal plate are linearly polarized beams in which the electric vector is in the direction along the xy plane (extraordinary beams) The light beams are incident on the crystal plate with forming a large angle (for example, about 71 deg.) to the normal (x-axis) of the side face.

When the thickness in the z direction of the crystal plate is set to 1 mm and the apex angle θ of the saw-tooth like shape of the electrode pattern is set to about 52 deg., the angle of emission in the plane of emission 6d is about 72 deg. When a varying voltage of ±40 V is applied between the electrodes by the voltage driving circuit 17, the electrooptic effect causes the refractive index to be varied by ±0.000008 with respect to the transmitted beams (extraordinary beams). When the beams are transmitted through the plane of incidence 6c and the plane of emission 6d, therefore, a difference in angle of refraction due to the difference in refractive index occurs, and deflection 8 of about ±0.002 deg. which is synchronized with the varying voltage is generated in the emitted light beams 7.

When the focal length of the objective lens is 3 mm, the angle of deflection corresponds to displacement of ±0.1 μm on the signal surface 12S. Since the response speed of the electrooptic effect is very high, the responsibility is expected to be 1 GHz or higher which corresponds to several tens to hundreds of times the signal band of the optical disk.

As described in the embodiments, the converged light spot can be displaced at a high speed in a direction perpendicular to the track direction, and hence erasure or overwriting in which no unerased portion is formed can be realized. Without changing the diameter of a converged light spot or the density of signal marks, furthermore, the variety of information can be increased by combining information of offtrack of signal marks with information of the length of each signal mark and of the length between the signal marks. Therefore, the density of information can be accordingly increased, and hence a large effect is attained in realizing recording and reproduction of a high-density signal. Moreover, influence of crosstalk can be suppressed, and the offtrack state of a signal mark can be correctly judged. Therefore, the reliability and realizability of the device are very high.

As apparent from the above description, according to the invention, it is possible to provide an optical disk, an optical disk device, a data recording method, and a data reproducing method in which the information density can be increased without changing the diameter of a converged light spot or the density of signal marks, and the density can be further increased by combining the invention with reduction of the diameter of a converged light spot by a reduced wavelength of a light source or a high NA of an objective lens.

What is claimed is:

1. An optical disk having plural tracks, wherein, in each of signal mark forming regions, each of lands, or each of grooves, a signal mark is formed with being positioned at any one of plural positions which are arranged in a direction that is substantially perpendicular to the tracks each of said signal mark forming regions surrounded by adjacent two of boarder lines which are between two said tracks on the signal surface, and which are substantially parallel to said tracks, and each of which substantially divides an area between adjacent tracks in two parts.

2. An optical disk according to claim 1, wherein said signal mark is formed so that, as said signal mark is shorter, a degree of deviating a beginning and an end of said signal mark, and/or a portion between the beginning and the end of said signal mark, from said track is larger.

3. An optical disk according to claim 1 or 2, wherein said signal mark is formed on said optical disk, by using a signal modulation system in which minimum continuation of bit information code 0 is 1.

4. An optical disk device comprising:
a light source which emits light;
light converging means of converging the light from said light source onto a signal mark of said optical disk according to claim 1;
light detecting means of detecting light reflected from said optical disk; and
analyzing means of, based on a result of detection of said light detecting means, judging a degree of deviation of said signal mark from said track in the direction that is substantially perpendicular to said track, judging a position of said signal mark, and analyzing data recorded on said optical disk.

5. An optical disk device according to claim 4, wherein said analyzing means performs the judgment by using a portion of the light from said optical disk, said portion being on an outer peripheral side.

6. An optical disk device according to claim 4 or 5, wherein said device further comprises light branching means of branching the light reflected from said optical disk into a-light and b-light by means of a predetermined line corresponding to a tangential direction of said track, and causing the a-light and the b-light to proceed to said light detecting means, said light detecting means has a-light amount detecting means of detecting an amount of the a-light, and b-light amount detecting means of detecting an amount of the b-light, and said analyzing means judges the deviation degree on the basis of a difference between the amount of the a-light and the amount of the b-light, and judges a length of said signal mark in a substantially tangential direction of said track on the basis of a sum of the amount of the a-light and the amount of the b-light.

7. An optical disk device according to claim 4 or 5, wherein said device further comprises light branching means of: branching the light reflected from said optical disk into light of an inner peripheral side of the reflected light, and light of an outer peripheral side of the reflected light; further branching the light of the outer peripheral side into a-light and b-light by means of a predetermined line corresponding to a tangential direction of said track; and causing the light of the inner peripheral side, the a-light and the b-light to proceed to said light detecting means, said light detecting means has inner-periphery light amount detecting means of detecting an amount of the light of the inner peripheral side, a-light amount detecting means of detecting an amount of the a-light, and b-light amount detecting means of detecting an amount of the b-light, and said analyzing means judges the deviation degree on the basis of a difference between the amount of the a-light and the amount of the b-light, and judges a length of said signal mark in a substantially tangential direction of said track on the basis of the amount of the light of the inner peripheral side, a sum of the amount of the a-light and the amount of the b-light, or a sum of the amount of the light of the inner peripheral side, and the sum of the amount of the a-light and the amount of the b-light.

8. An optical disk device according to claim 4 or 5, wherein said analyzing means judges a beginning of said signal mark when the sum or the amount of the light of the inner peripheral side is reduced or increased to substantially reach a predetermined value, judges an end of said signal mark when the sum or the amount of the light of the inner peripheral side is increased or reduced to substantially reach a predetermined value, and reads that, when, in the beginning or the end of said signal mark, the difference is larger than a predetermined first value which is positive, it means that a data in the beginning or the end is a predetermined first data value; when the difference is smaller than a predetermined second value which is negative, it means that the data in the beginning or the end is a predetermined second data value; and, when the difference is not smaller than the second value and not larger than the first value, it means that the data in the beginning or the end is a predetermined third data value.

9. An optical disk device according to claim 4 or 5, wherein said device further comprises light branching means of branching the light reflected from said optical disk into a-light, b-light, c-light, and d-light by means of a first line corresponding to a tangential direction of said track and a second line corresponding to the direction perpendicular to said track, and causing the a-light, the b-light, the c-light, and the d-light to proceed to said light detecting means, the a-light and the c-light are in diagonal relationship in the reflected light, the b-light and the d-light are in diagonal relationship in the reflected light, said light detecting means has a-light amount detecting means of detecting an amount of the a-light, b-light amount detecting means of detecting an amount of the b-light, c-light amount detecting means of detecting an amount of the c-light, and d-light amount detecting means of detecting an amount of the d-light, and said analyzing means judges the deviation degree on the basis of a difference between a first sum of the amount of the a-light and the amount of the c-light and a second sum of the amount of the b-light and the amount of the d-light, and judges a length of said signal mark in a substantially tangential direction of said track on the basis of a sum of the first sum and the second sum.

10. An optical disk device according to claim 4 or 5, wherein said device further comprises light branching means of: branching the light reflected from said optical disk into light of an inner peripheral side of the reflected light, and light of an outer peripheral side of the reflected light; further branching the light of the outer peripheral side into a-light, b-light, c-light, and d-light by means of a first line corresponding to a tangential direction of said track and a second line corresponding to the direction perpendicular to said track; and causing the light of the inner peripheral side, the a-light, the b-light, the c-light, and the d-light to proceed to said light detecting means, the a-light and the c-light are in diagonal relationship in the reflected light, the b-light and the d-light are in diagonal relationship in the reflected light, said light detecting means has inner-periphery light amount detecting means of detecting an amount of the light of the inner peripheral side, a-light amount detecting means of detecting an amount of the a-light, b-light amount detecting means of detecting an amount of the b-light, c-light amount detecting means for detecting an amount of the c-light, and d-light amount detecting means of detecting an amount of the d-light, and said analyzing means judges the deviation degree on the basis of a difference between a first sum of the amount of the a-light and the amount of the c-light and a second sum of the amount of the b-light and the amount of the d-light, and judges a length of said signal mark in a substantially tangential direction of said track on the basis of the amount of the light of the inner peripheral side, the sum of the first sum and the second sum, or a sum of the amount of the light of the inner peripheral side and the sum of the first sum and the second sum.

11. An optical disk device according to claims 4 or 5, wherein said analyzing means judges a beginning of said signal mark when the sum or the amount of the light of the inner peripheral side is reduced to substantially reach a predetermined value, judges an end of said signal mark when the sum or the amount of the light of the inner peripheral side is increased to substantially reach a predetermined value, reads that, when, in the beginning of said signal mark, the difference is larger than a predetermined first value which is positive, it means that a data in the beginning is a first predetermined data value; when the difference is smaller than a predetermined second value which is negative, it means that the data in the beginning is a predetermined second data value; and, when the difference is not smaller than the second value and not larger than the first value, it means that the data in the beginning is a predetermined third data value, and reads that, when, in the end of the said signal mark, the difference is larger than the first value, it means that a data in the end is the third data value; when the difference is smaller than the second value, it means that the data in the end is the first data value; and, when the difference is not smaller than the second value and not larger than the first value, it means that the data in the end is the third data value.

12. A data reproducing method in which light is converged onto a signal mark of said optical disk according to claim 1 or 2, light reflected from said optical disk is detected; based on a result of the detection, judging a degree of deviation of said signal mark on each of tracks of said optical disk, from said track in the direction that is substantially perpendicular to said track, judging a position of said signal mark, and analyzing data recorded on said optical disk to reproduce the data.

13. A data recording method in which, in each of signal mark forming regions, each of lands, or each of grooves of an optical disk, light from a light source is converged onto said optical disk with selectively positioning a signal mark at any one of plural positions which are arranged in a direction that is substantially perpendicular to tracks thereby forming a signal mark on said optical disk, each of said signal mark forming regions surrounded by adjacent two of boarder lines which are between two said tracks on the signal surface of said optical disk, and which are substantially parallel to said tracks, and each of which substantially divides an area between adjacent tracks in two parts.

* * * * *